Nov. 24, 1953          G. R. CORDELL          2,660,507
        SYSTEM AND APPARATUS FOR DETERMINING THE LISTENING
                    HABITS OF WAVE SIGNAL RECEIVER USERS
Filed March 26, 1948                                10 Sheets-Sheet 5
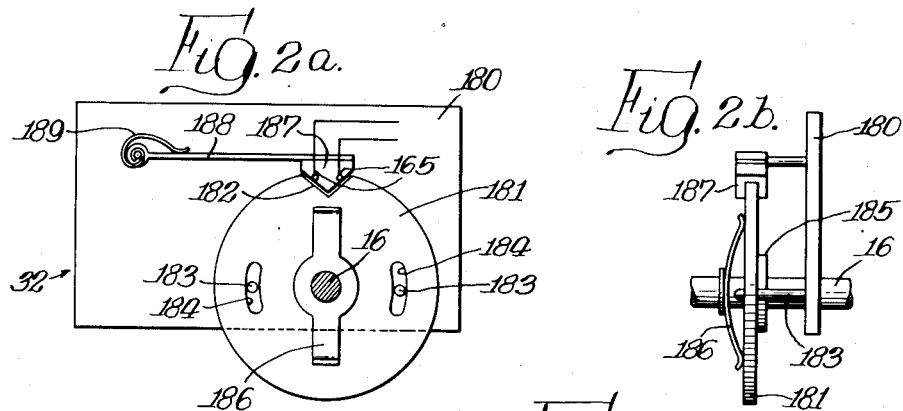
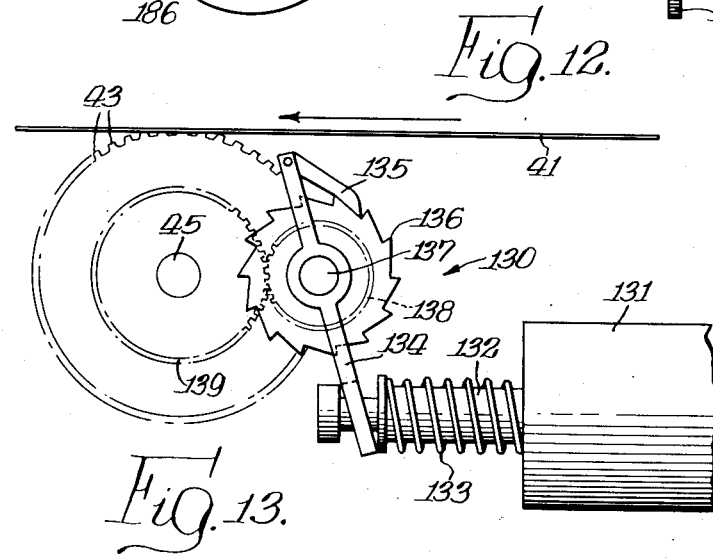
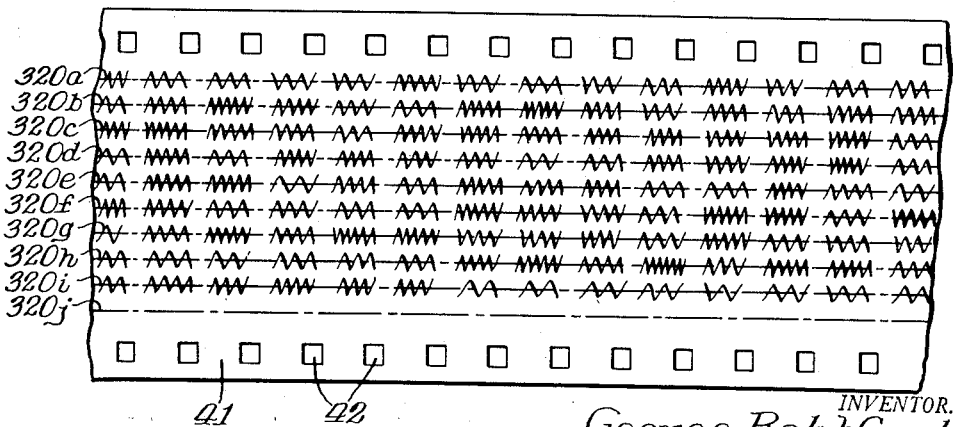
INVENTOR.
George Ralph Cordell,
Mason, Kolehmainen, Rathburn & Wyss
Atty's.

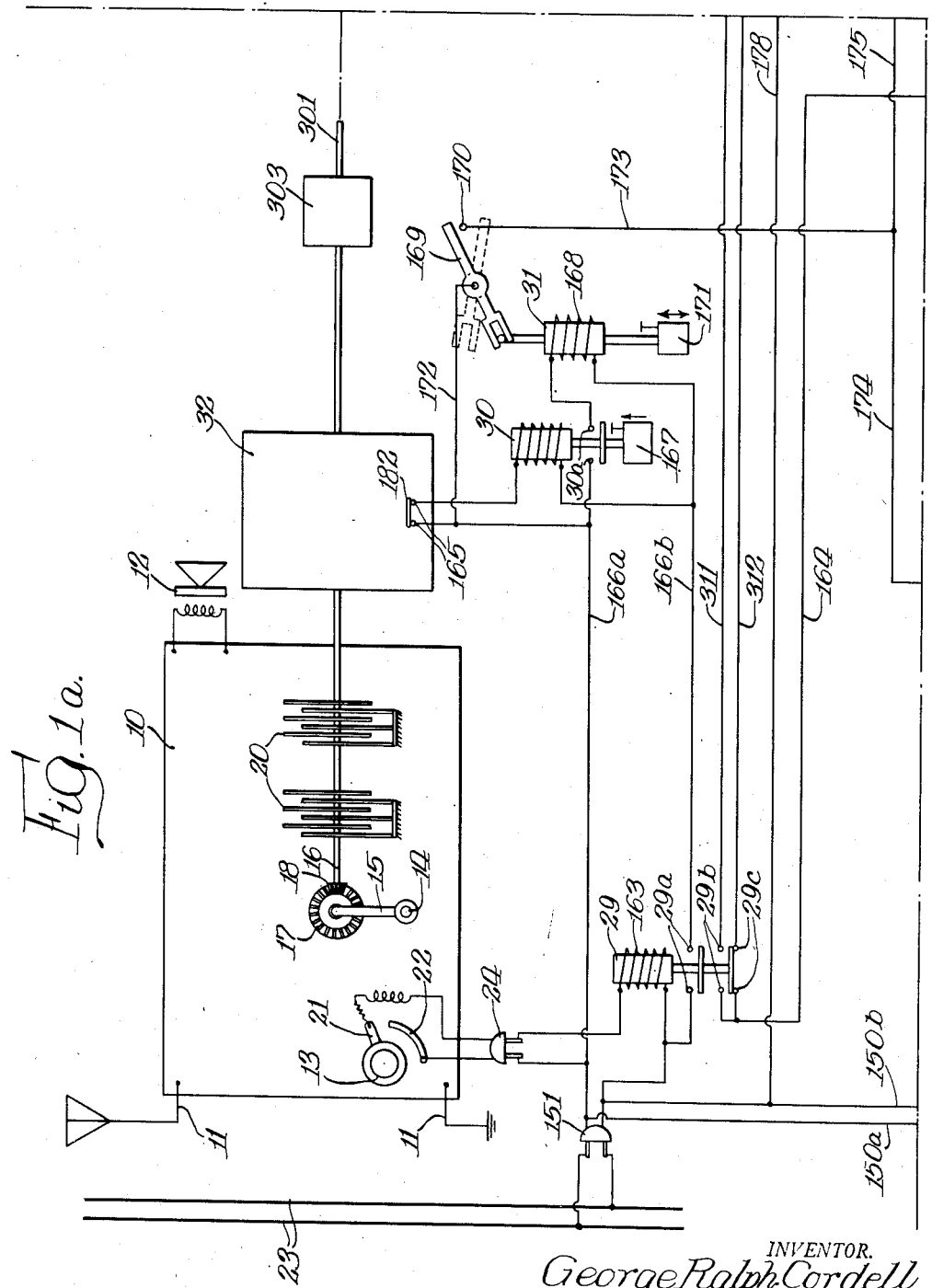

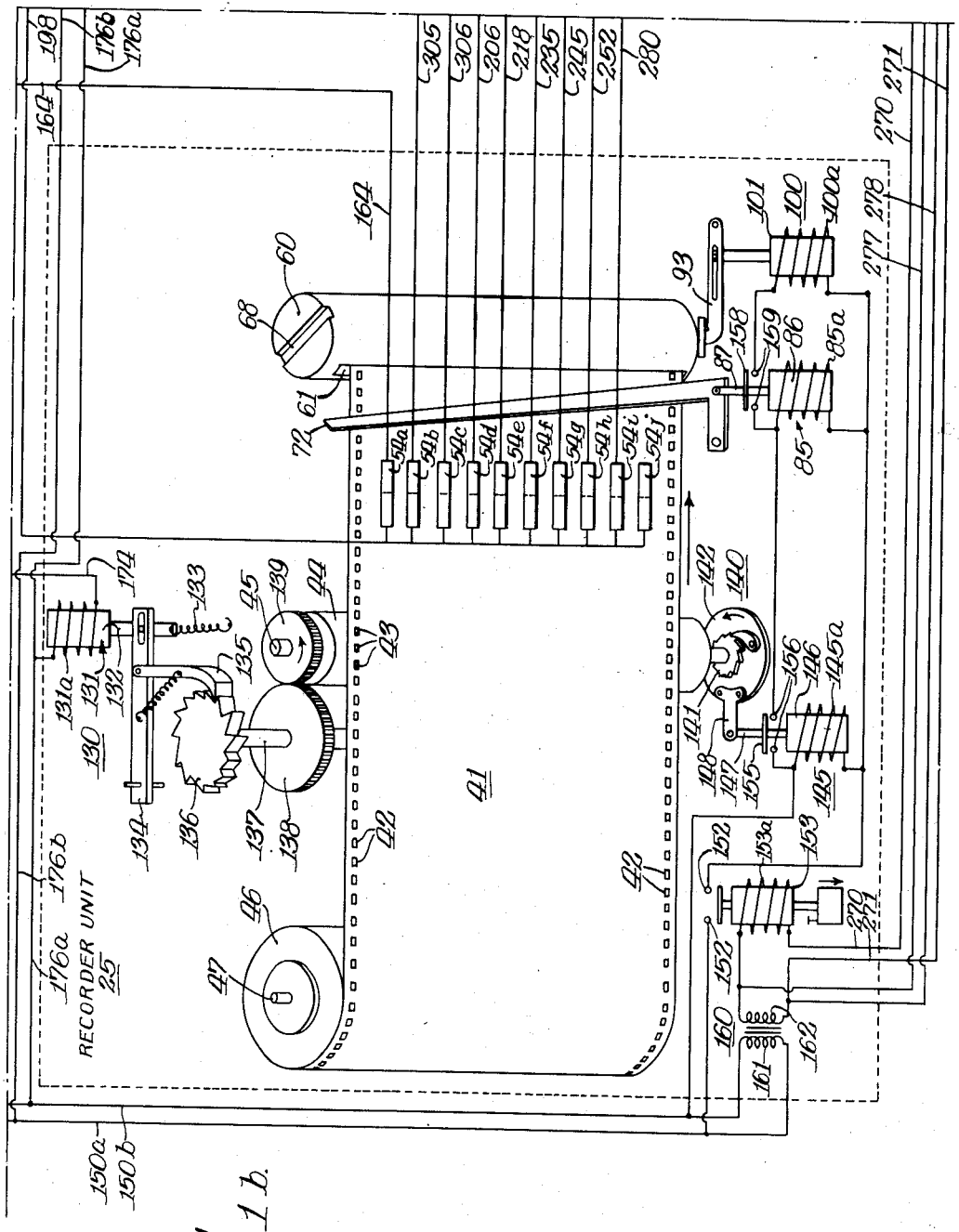

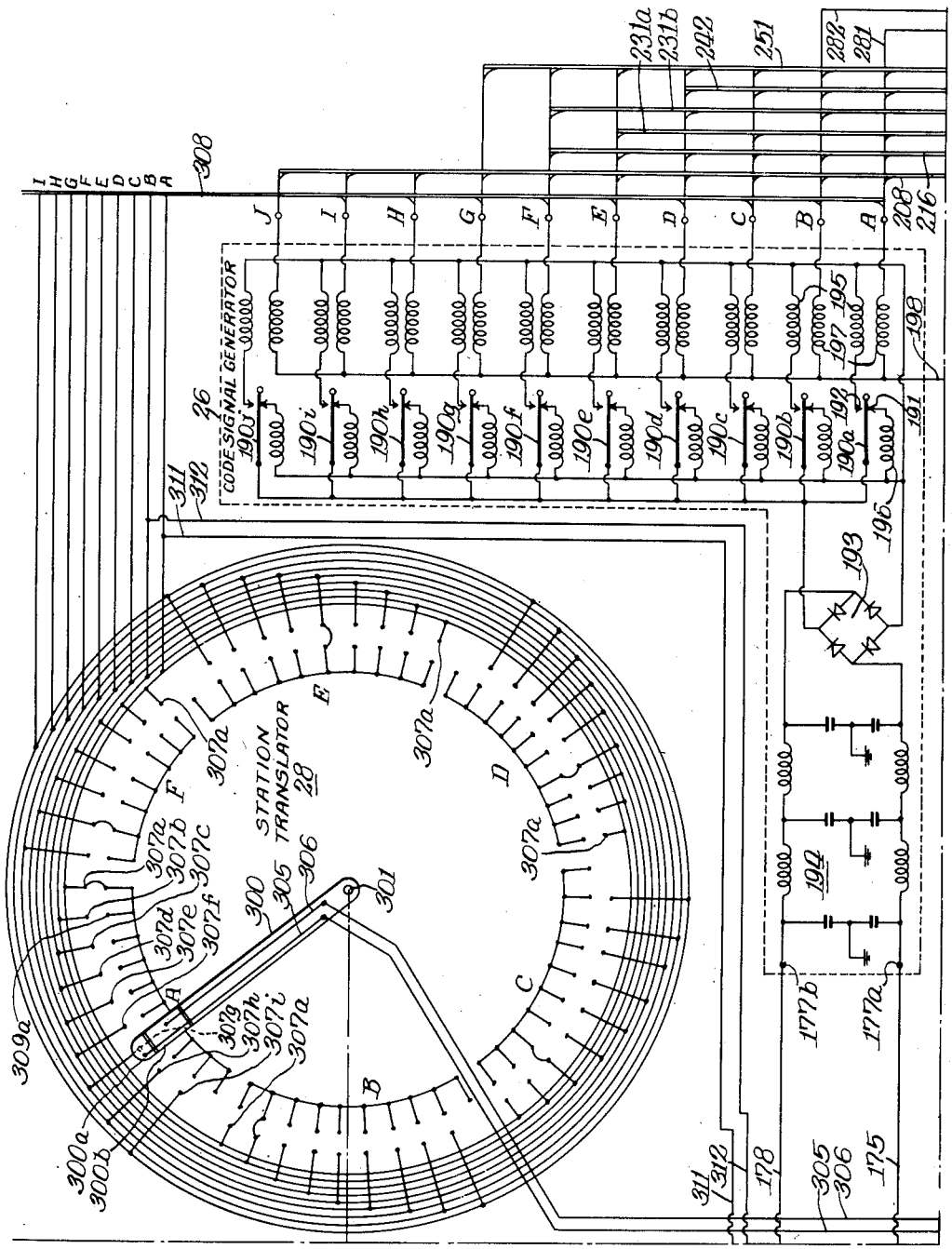

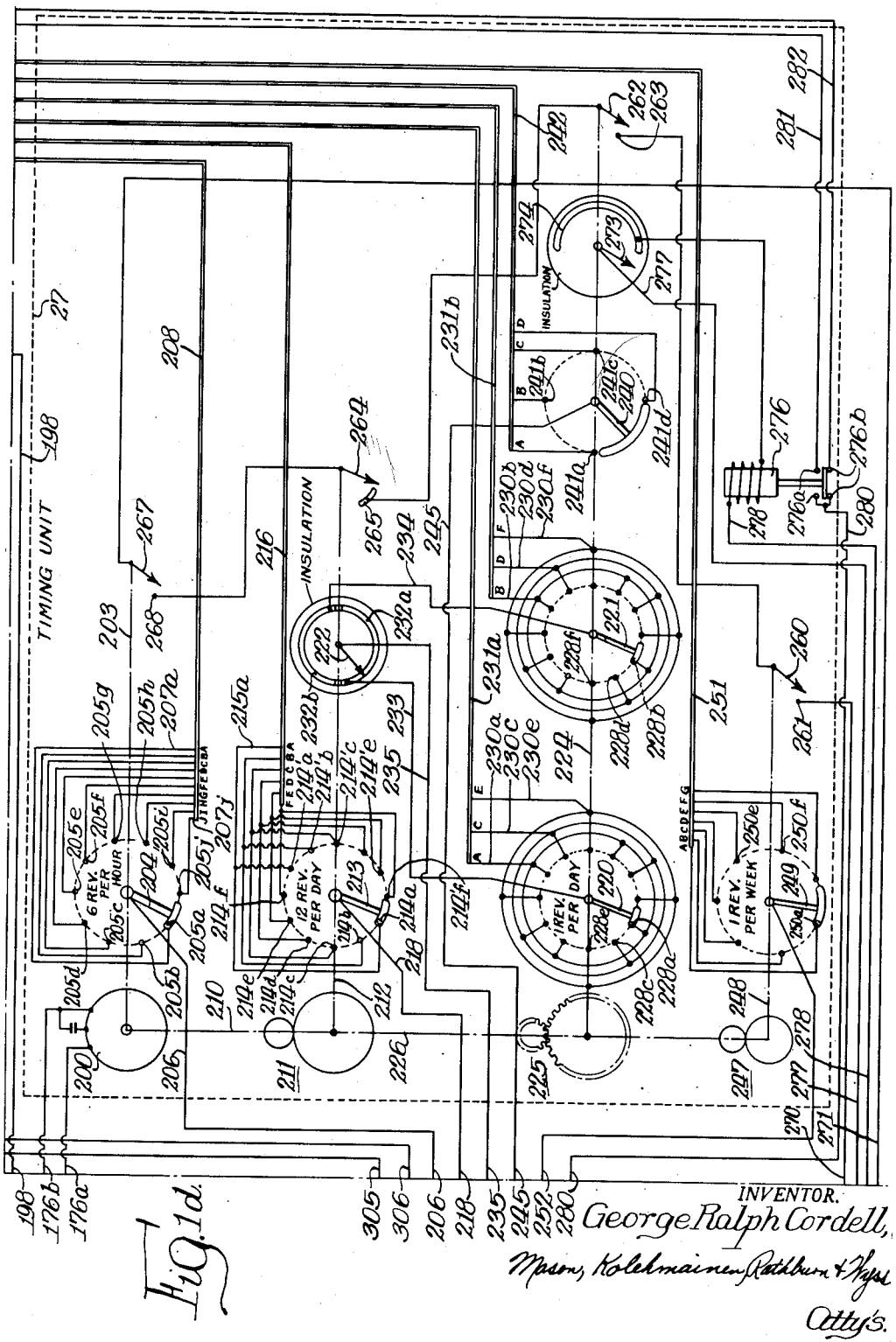

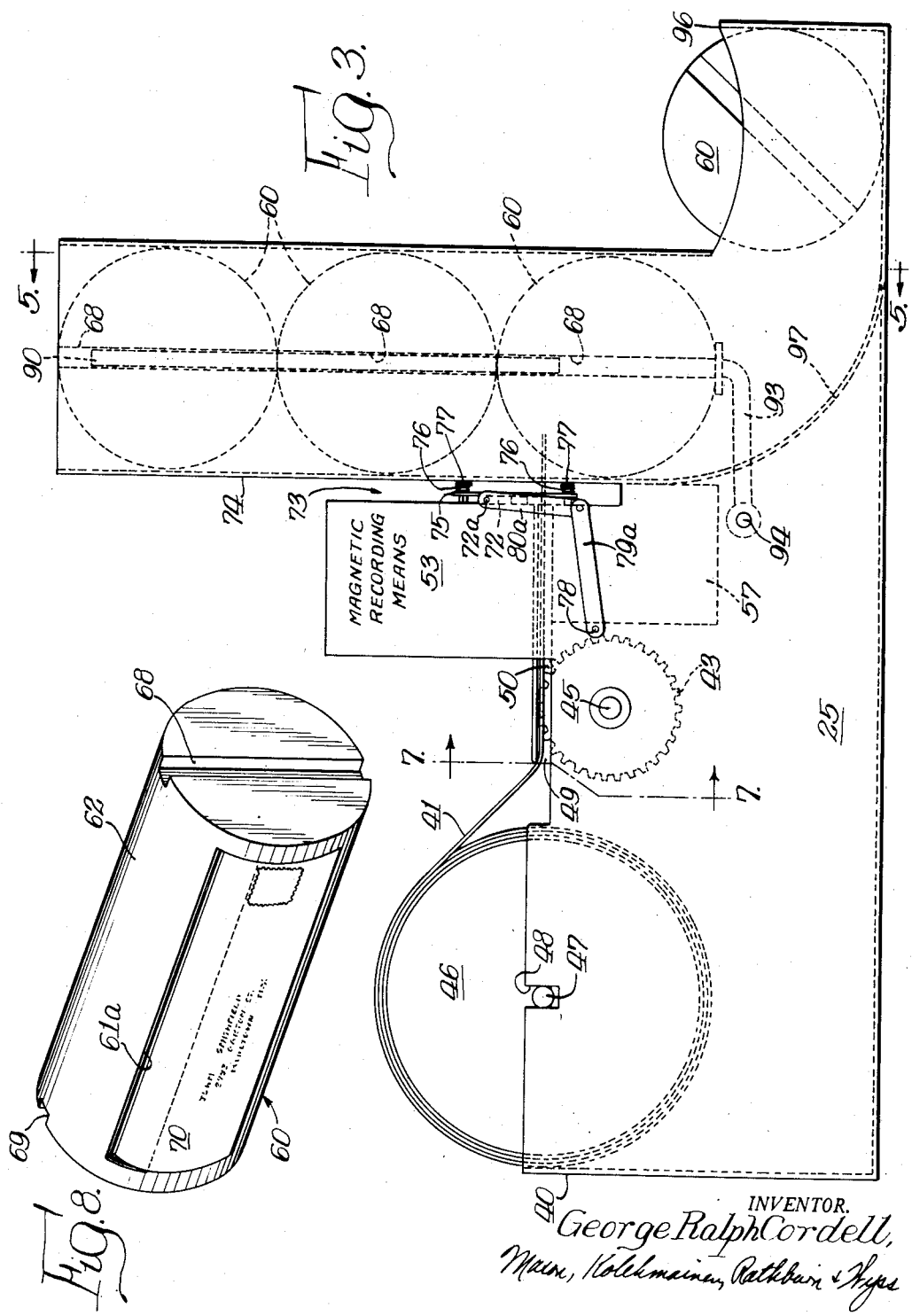

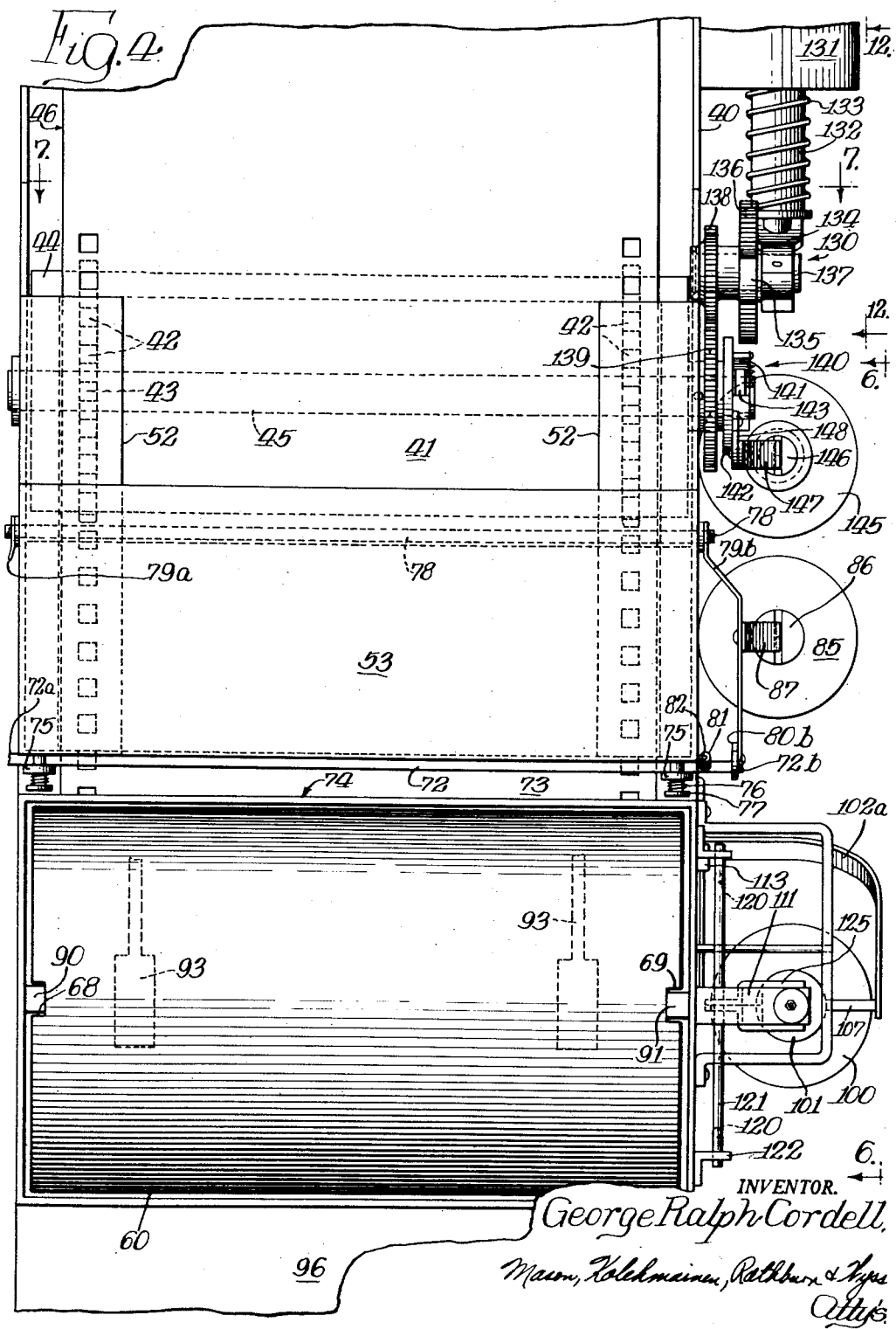

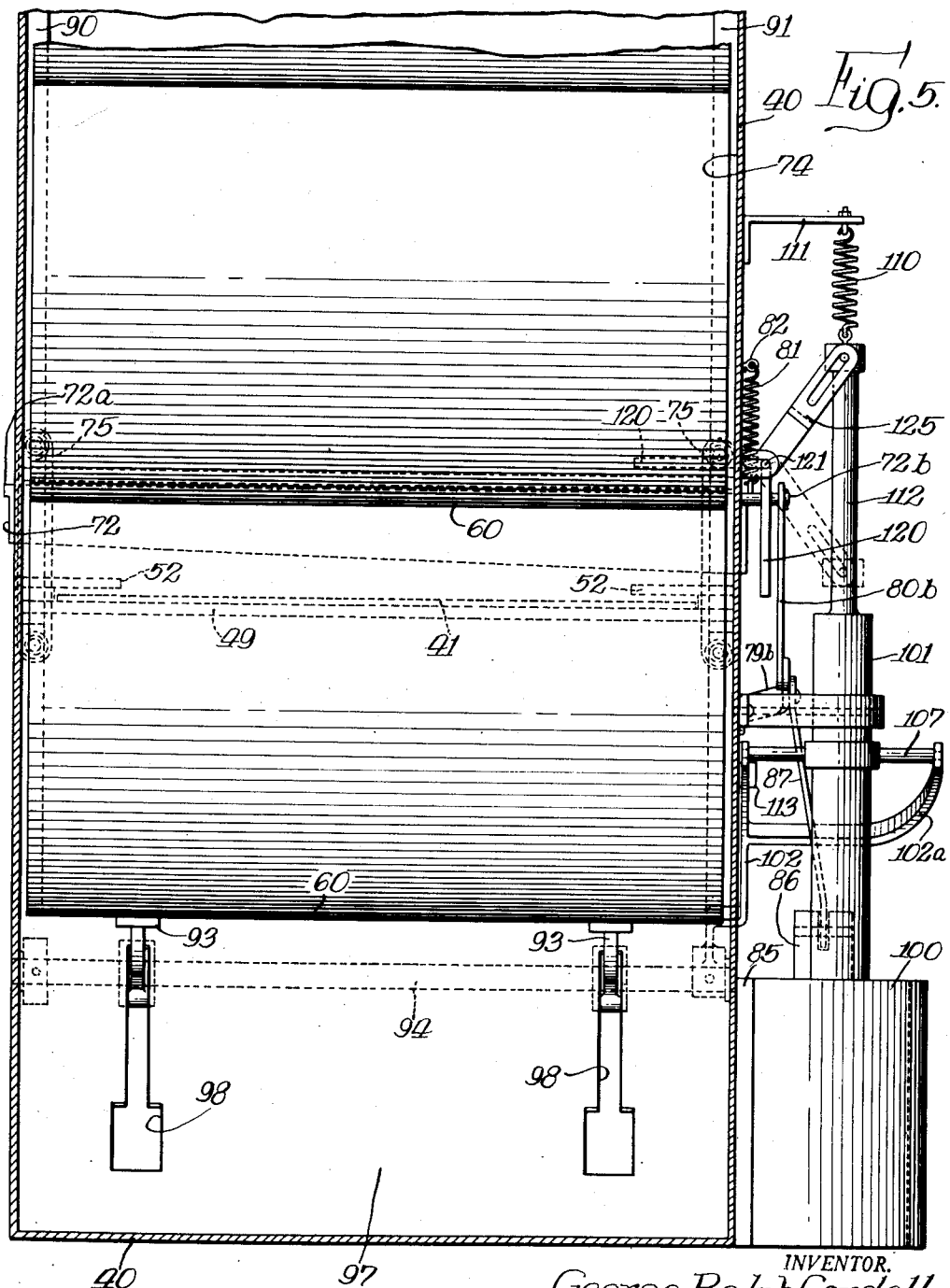

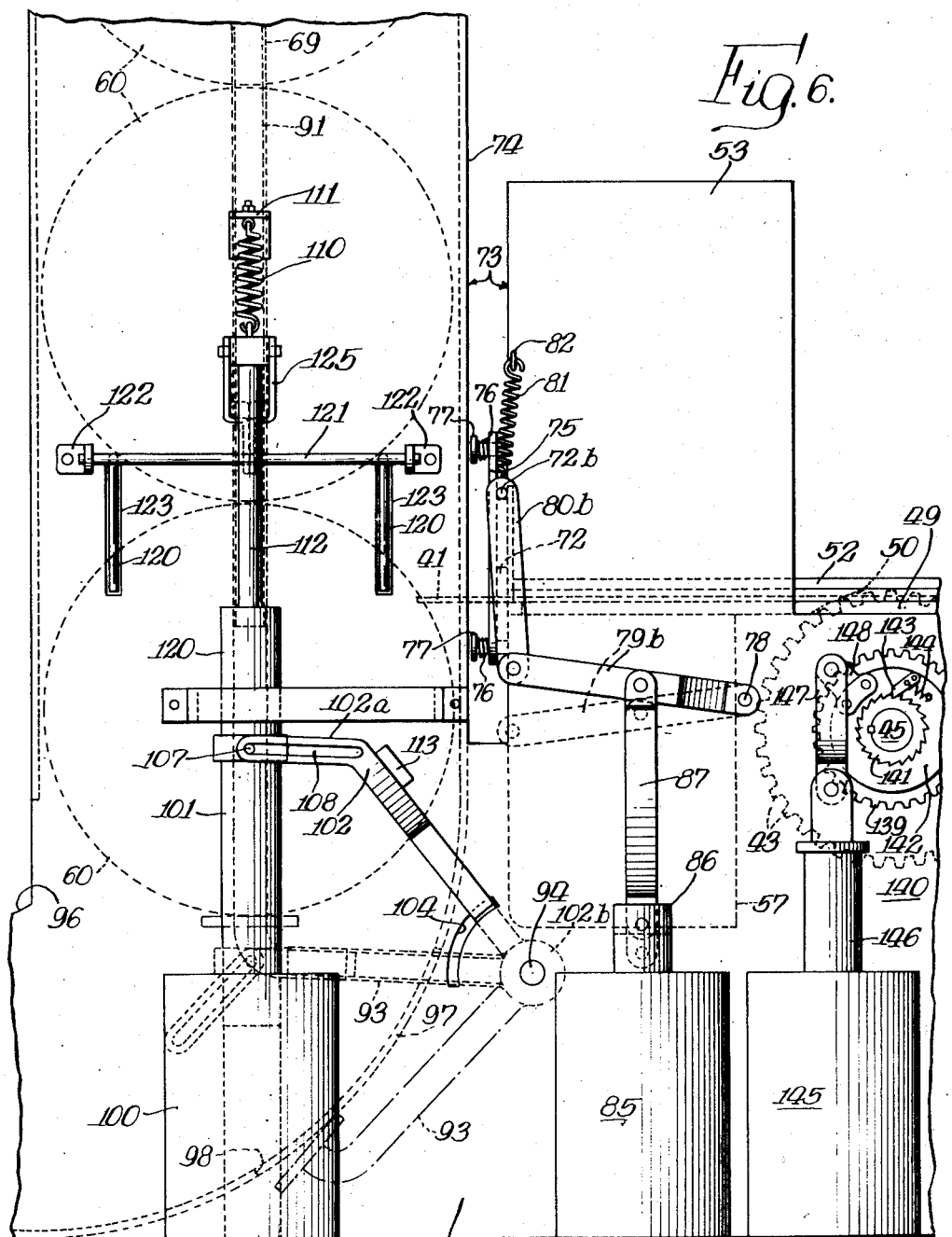

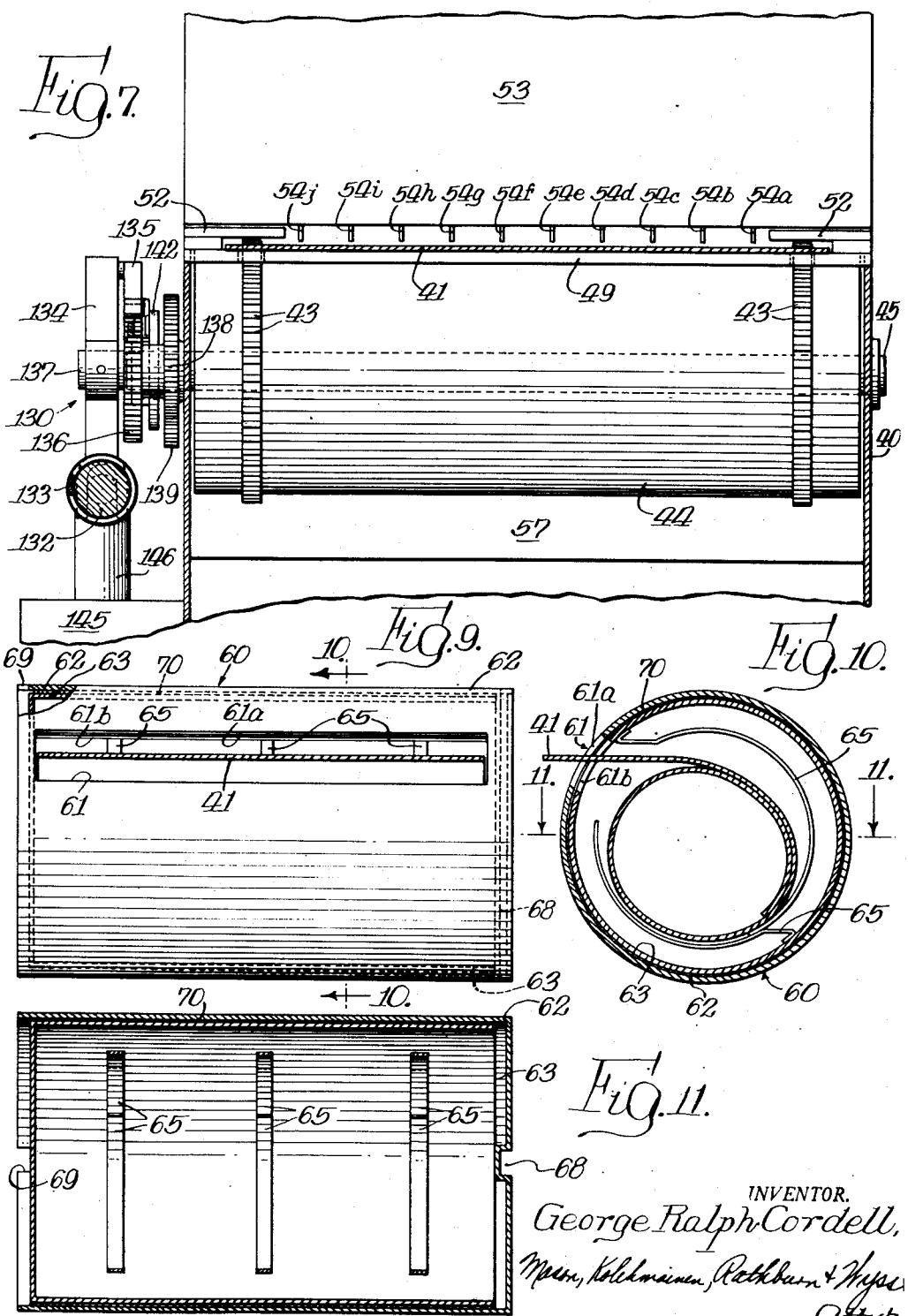

Patented Nov. 24, 1953

2,660,507

UNITED STATES PATENT OFFICE 2,660,507

SYSTEM AND APPARATUS FOR DETERMINING THE LISTENING HABITS OF WAVE SIGNAL RECEIVER USERS

George Ralph Cordell, Terre Haute, Ind., assignor to A. C. Nielsen Company, Chicago, Ill., a corporation of Illinois Application March 26, 1948, Serial No. 17,314

17 Claims. (Cl. 346—22)

The present invention relates to a system and apparatus for determining the listening habits (or viewing habits in the case of television) of users of wave signal receivers for any band whether standard broadcast, short wave, frequency modulation, television or the like. More particularly the present invention relates to an improved system and apparatus for determining the audience popularity rating of different programs transmitted from one or more wave signal transmitters and for gathering other information of great importance in determining the effectiveness of radio advertising.

Instrumented methods of determining the listening habits of home radio receiver users have been found to be the only satisfactory way of obtaining accurate information with regard to the listening or viewing habits of such wave signal receiver users. Such instrumented methods generally involve the use of a recording device operating in conjunction with one or more receivers in a particular collaborator's home. In certain situations it is desirable to use a recording device common to a plurality of homes used in the sampling system to record the extent of use of the receiver or receivers and to record as a function of time the particular channels to which the receiver or receivers are tuned for program reception. One device of this type commonly used heretofore comprises facilities for driving in a predetermined manner with respect to time, such as at constant speed, a recording element, such as a tape, for example, together with a translating means for variably positioning a recording stylus relative to the recording element in accordance with the tuning condition of the receivers. From the record on the recording element it is possible to determine the particular stations to which one or more receivers were tuned and also the length of time that the receiver or receivers were tuned to various channels. The transverse positions of the record indications relative to the recording element were indicative of the channels to which the receiver was tuned. By moving the recording element at a constant speed and knowing the starting time when the element was put in operation each following point therealong is representative of a later chronological instant so long as the recording element continues to be driven at a constant speed.

It will be apparent that where the channels to which a wave signal receiver may be tuned are indicated by the transverse position of traces produced on the recording element that there is a space limitation to the number of channels which can be indicated thereon. Heretofore this has been no problem, since in any locality the number of channels to which a receiver is likely to be tuned is relatively limited. However, in recent years there has been an increased use of multi-band receivers including the standard broadcast band, the short wave band, the frequency modulation or F. M. band and even the television band, many modern receivers providing reception in at least three bands. Furthermore statistics have shown that the percentage of homes in which more than one receiver is used has steadily increased so that at the present time one-third of all radio homes have two or more receivers. It is apparent that to get all the information from a plurality of receivers, capable of being tuned to a plurality of wave bands, on a single recording element using the transverse position of the trace on the record tape as uniquely identifying the tuning condition may cause considerable difficulty. It would be desirable to provide in a simple manner an arrangement in which the tuning condition of a plurality of receivers to substantially all channels within all the different wave bands can readily be recorded on a single simple recording element of conventional size.

Statistics show that today the average wave signal receiver is used only about four and one half hours per day. This means that such a receiver is used only a little over twenty percent of the time. Where the recording element moves at a constant speed to provide time information it is apparent that almost eighty percent of the recording element will contain no information with respect to the channels to which the receiver is tuned, the absence of a record indicating that the receiver was not turned on. If the sample of radio receiver homes chosen for obtaining the marketing research information is large covering a thousand or several thousand homes, it is apparent that the amount of recording elements used becomes a substantial factor. It would be desirable to provide a recording device which would conserve the recording element and substantially only consume or effectively expose such recording element when it is desired to produce a record thereon, while at the same time still providing the necessary time information thereon.

As has been fully described in co-pending Rahmel application, Serial No. 762,962, filed July 23, 1947, and assigned to the same assignee as the present application, the cost of obtaining information with reference to the listening habits of wave signal receiver users is greatly reduced if the recorder is provided with a mailable magazine for the recording element. It would be desirable further to decrease the cost of obtaining the necessary information with respect to the listening habits of wave signal receiver users by providing an inexpensive simple means for receiving the recording element which has effectively been exposed which means can readily be mailed to the analysis organization for decoding and analyzing the information contained on the recording element.

Accordingly it is an object of the present invention to provide a new and improved system and apparatus for recording information pertinent to the listening or viewing habits of wave signal receiver users.

It is another object of the present invention to provide improved apparatus for recording the tuning condition of one or more wave signal receivers with a simple means for recording the desired information on a relatively small recording element regardless of either the number of receivers involved, the number of channels to which the receivers may be tuned, or the number of bands in which the channels may be located.

It is a further object of the present invention to provide a new and improved device in which all information pertinent to the tuning condition of a wave signal receiver is applied to a recording element in the form of a code.

It is another object of the present invention to provide a new and improved device for recording the listening habits of wave signal receiver users where the movable recording element is moved substantially only at times when a record has been produced thereon or is to be produced thereon.

Still a further object of the present invention is to provide a new and improved arrangement for recording the tuning conditions of one or more wave signal receivers in which no ambiguity with regard to the record produced can occur and wherein it is readily possible to decode the information recorded without any ambiguity.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Figs. 1a, 1b, 1c and 1d are diagrammatic illustrations showing first, second, third and fourth portions of the system and apparatus of the present invention, arranged so as to be united into a single disclosure, Fig. 1a showing the receiver being monitored and certain associated equipment, Fig. 1b showing the recorder, Fig. 1c showing the station translator and code signal generator and Fig. 1d showing the timing unit.

Figs. 2a and 2b are detailed views of one device which may be used for a device shown in block diagram in Fig. 1a of the drawings.

Fig. 3 is an elevational view of the recorder shown schematically in Fig. 1b of the drawings;

Fig. 4 is an enlarged top view of a portion of the recorder shown in Fig. 3 of the drawings:

Fig. 5 is a sectional view taken substantially at line 5—5 of Fig. 3;

Fig. 6 is a side view of a portion of the recorder shown in Fig. 4 of the drawings and taken substantially in the direction of the arrows 6—6 of Fig. 4;

Fig. 7 is a partial sectional view taken on line 7—7 of Fig. 4;

Fig. 8 is a perspective view of a cartridge for receiving the recording element employed in connection with the recorder of the present invention shown in condition for mailing;

Fig. 9 is a detailed view of the cartridge shown in Fig. 8 with portions thereof broken away, the cartridge being shown in the film receiving position;

Fig. 10 is a sectional view taken on line 10—10 of Fig. 9;

Fig. 11 is a sectional view taken on line 11—11 of Fig. 10 assuming that Fig. 10 shows the complete cartridge;

Fig. 12 is a view of a ratchet gear mechanism of the recorder of the present invention taken in the direction of the arrows 12—12 of Fig. 4; and Fig. 13 is a view of a portion of the recording element showing a typical record thereon.

Although the present invention, as will become apparent from the following description, lends itself especially well to recording the tuning condition of receivers used in multiple receiver homes, some or all of which receivers may be multi-band receivers, for the purpose of illustrating the invention only a single receiver has been illustrated. From the following description however it will be readily apparent that the system and apparatus of the present invention is very flexible and can record information pertinent to a large number of receivers tuned to an indefinite number of channels including channels in all wave bands.

Referring now to the schematic disclosures shown in Figs. 1a, 1b, 1c and 1d of the drawings there is illustrated a wave signal receiver 10 which may comprise any type of wave signal receiver whether of the type capable of being tuned to only one band or whether of the more complex type of receiving in addition to the standard broadcast band frequency modulation signals and perhaps even television signals. As illustrated the wave signal receiver 10, shown in block diagram, comprises an antenna ground input circuit 11 and an output unit generally designated at 12 which may comprise a loud speaker in the case of audio signals but which might comprise some other signal reproducer in the case of television signals. The receiver 10 is indicated as comprising a manually actuable knob 13 for turning the receiver on and off and conventionally for manually adjusting the volume control. In addition the wave signal receiver 10 comprises a suitable tuning device which is illustrated as comprising a manually actuable knob 14 which is adapted to actuate through suitable shafts 15 and 16 and gears 17 and 18, a suitable resonant frequency varying device generally indicated at 20. This resonant frequency varying device might comprise movable ferromagnetic cores in the event of permeability tuning; ganged condensers in the event of condenser tuning or any other suitable means. As illustrated in the drawings the resonant frequency varying device 20 comprises ganged condensers the rotors of which are movable with the shaft 16 which in turn is actuable by virtue of the tuning knob 14. The manual knob 13 is illustrated as adapted to control a movable contact 21 which is engageable with a stationary contact 22. Conventionally the wave signal receiver 10 is adapted to be connected to a suitable source of power generally designated at 23 by means of a suitable power cord terminating in a plug connector 24, the power circuit being completed by the switch contacts 21 and 22 when the receiver 10 is turned on.

For the purpose of recording the tuning condition of the wave signal receiver 10 there is provided what might be designated as a receiver attachment associated with the wave signal receiver attachment associated with the wave signal receiver 10 for recording the tuning condition thereof. In order to simplify the disclosure, the receiver attachment is illustrated as including the complete recording apparatus directly associated with the receiver 10. It will be understood however that in accordance with the teachings of Rahmel and Bentley Patent 2,484,733 that the receiver attachment might comprise a very small device and the remainder of the apparatus may be disposed at a point remote from the receiver within the basement or a closet of the home or in those cases where an ultra high frequency technique is employed the recording equipment may be located at a central office operated by the marketing research analysis organization which recording equipment would be capable of recording the tuning conditions of a plurality of receivers located in a plurality of homes.

Essentially the apparatus of the present invention comprises a recorder unit generally designated at 25, a code signal generator generally designated at 26, a timing unit generally designated at 27, a station translator designated at 28, control relays 29, 30 and 31 and a control device 32. The various parts of the system and apparatus are separately discussed hereinafter.

Recorder unit 25

The recorder unit 25 schematically shown in Fig. 1b of the drawings is shown in detail in Figs. 3 to 12 inclusive of the drawings and the corresponding parts of the schematic disclosure in Fig. 1b are designated by the same reference numerals as in the remaining figures of the drawing. Essentially the recorder 25 comprises a suitable housing 40 for mounting a movable record element generally designated at 41 which movable record element 41 may be a tape capable of having a trace or record produced thereon by any suitable means whether mechanical, electrical or electromagnetic. As illustrated the record element 41 comprises a magnetic record tape having spaced perforations 42 along one or more edges thereof for engaging with the sprocket teeth 43 on a drive sprocket 44 suitably mounted for rotation in the housing 40. As illustrated the drive sprocket 44 is provided with a shaft 45 suitably journaled in the housing 40.

For the purpose of providing a large supply of record element 41 which may be fed to the sprocket 43 as desired, a supply roll 46 is disclosed as being mounted on a shaft 47 which is suitably journaled in the housing 40 in a position parallel with the drive sprocket 44 as illustrated. In order that a new supply roll may readily be inserted when the record element on the particular supply roll mounted in housing 40 is exhausted the shaft 47 of the supply roll 46 is adapted to be rotatably mounted in suitable notches 48 defined in the side walls of the housing 40. Any suitable friction means such for example as the spring belt arrangement disclosed in the above mentioned co-pending Rahmel application for maintaining the recording element 41 taut between the drive sprocket 43 and the supply roll 46 may be provided.

In order to guide the recording element 41 in the recorder 25 at the point where it engages the drive sprocket 44, and thereafter, there is provided a suitable table 49 upon which the recording element rests during its movement controlled by the drive sprocket 44. An opening 50, best shown in Figs. 3 and 6 of the drawings, is defined in the table 49 for receiving the drive sprocket 44 so that the sprocket teeth 43 thereof may extend above the table surface to engage the perforations 42 in the recording element 41. Preferably the table 49 is provided with suitable tape guides 52 at either edge thereof which overlie the edges of the recording element 41 so that movement thereof is constrained in a predetermined manner.

As was mentioned above any suitable means may be provided for producing record indications on the recording element 41. In the drawings the recording means is illustrated as magnetic recording means generally designated at 53. Since the particular recording means forms no part of the present invention the details thereof are not shown except to indicate schematically in Fig. 1b of the drawings, a plurality of magnetic recording heads 54. As illustrated schematically the recording means 53 comprises ten recording heads designated as 54a, 54b, 54c, 54d, 54e, 54f, 54g, 54h, 54i and 54j disposed in equally spaced relationship transversely of the recording element 41. These recording heads 54a to 54j are disposed so as to produce traces transversely of the recording element 41 in a manner to be described hereinafter. It will be understood that if magnetic recording heads such as 54a to 54j inclusive are employed that the recording element 41 will comprise a suitable magnetic tape. The tape receiving table 49 and the guides 52 for the tape extend beneath the recording unit 53 so as properly to guide the element 40 and support the same. To insure satisfactory recording the table 49 beneath the magnetic recording heads 54a to 54j may, if desired, comprise a suitable soft iron block or the like designated at 57 in Figs. 3 and 7 of the drawings.

Instead of providing a take up spool to receive the recording element 41 after it has passed beneath the recording heads 54 so that a record may be produced thereon, there is provided in accordance with the present invention a recording element-receiving cartridge generally designated at 60 which is provided with a suitable opening 61 adjacent the end of the table 49 remote from the drive sprocket 44 whereby the so-called "exposed" end of the recording element 41 may move into the opening 61 of the cartridge 60.

1. Mailable recording element cartridge 60

In accordance with the invention the mailable cartridge 60 is a very simple and inexpensive device so that it may actually be an expendable element of the recorder. As illustrated the cartridge 60 comprises an outer cylindrical housing 62 and an inner cylindrical housing 63 which are adapted to be telescopically related. The outer housing is provided with an elongated opening 61a and the inner housing is provided with a similar elongated opening 61b so that when these openings are aligned there is defined the opening 61 in the cartridge 60 for receiving the recording element 41. The outer cylindrical housing 62 is open at one end to receive the inner cylindrical housing 63 which may be a closed container having only the opening 61b therein, or as illustrated is similar to the housing 62 and also open at one end. Normally the inner and outer housing portions 62 and 63 of the cartridge 60 are rotated so the openings 61a and 61b are in alignment, whereby recording element 41 may readily be received therein. Preferably the housing sections 62 and 63 are of such relative dimensions that the inner housing readily fits into the outer housing. The sliding friction between the adjacent surfaces of the outer and inner housing portions 62 and 63 may be relied upon to hold the housing portions in any predetermined relative positions in which they may be moved by relative rotation thereof.

To more readily cause the recording element 41 received within the cartridge 60 to take the form of a roll there are provided a plurality of pairs of curved flat spring members 65 fastened to the inner housing member 63 at spaced points as is clearly shown in Figs. 10 and 11 of the drawings. These curved spring members 65 may each have one end welded or otherwise suitably fastened to the inside wall of the housing portion 63, each two spring members cooperating to form a loop having an entrance portion adjacent the opening 61 to receive the recording element 41 and to cause the recording element to curve into a small roll. As the roll of recording element 41 within the cartridge 60 increases in size the pairs of curved flat spring members 65 expand to relieve the pressure on the roll and allow the recording element 41 to continue to move into the cartridge 60 with the application of a minimum force.

It will be apparent that the opening 61 in the cartridge 60 must be held in a predetermined position relative to the recorder to insure proper movement of the recording element 41 therethrough. Accordingly the outer housing portion 62 is provided at its closed end with a diametrical groove 68 and at its open end with notches 69 disposed at diametrically opposed positions, the groove 68 being parallel with a line interconnecting notches 69. As will become apparent as the following description proceeds the groove 68 and the notches 69 are adapted to cooperate with suitable guide means for positioning the cartridge 60 in a predetermined manner relative to the recorder unit 25.

In accordance with the present invention the cartridge 60 is especially designed for mailing in a simple manner and as illustrated includes a suitable self-addressed and stamped mailing label 70 having the major portion pasted or otherwise suitably fastened to the exterior of the inner housing portion 63. A portion of this label 70 adjacent the opening 61b is free in that it is not pasted to the housing portion 62. When it is desired to mail the cartridge 60 with the "exposed" recording element 41 contained therein, relative rotation between the outer and inner housing portions 62 and 63 is produced so that the openings 61a and 61b are no longer in alignment and so that the mailing label 70 is exposed through the opening 61a. The relative rotation of the housing portions 62 and 63 must be such that the mailing address and stamp is exposed in the manner shown in Fig. 8 of the drawings. The free end of the mailing label 70 may be suitably gummed for pasting to the exterior of the housing portion 62. Since the other end of the label 70 is securely fastened to the inner housing portion 63 the label 70 not only functions as a mailing label but also holds the two housing portions 62 and 63 in a closed and substantially sealed manner to protect the recording element 41 contained therein while in transit between the collaborator's home and the analysis organization. It will be understood that, if desired, the mailing label 70 may be dispensed with and the mailing address may be applied directly to the exterior surface of the inner housing 63 so as to be exposed through the aperture 61b when the housing portions 62 and 63 are rotated effectively to close the opening 61. The necessary postage would of course also have been applied to the cartridge 60 by the analysis organization. If the outer and inner housings 62 and 63 fit together in a relatively tight manner friction will hold them in any desired predetermined positions to expose the address and stamp when the mailing label described above is dispensed with. If desired suitable simple locking means such as cooperating notches or the like may be provided to hold the inner and outer housing portions 62 and 63 in predetermined relative positions.

2. *Tape shear*

It will be apparent that in order to employ the mailable cartridge 60 described above that means must be provided for periodically cutting off the tape or recording element 41 to permit mailing of the cartridge 60 with the "exposed" recording element therein. In accordance with the present invention there is provided adjacent the recording unit 53 a suitable shear 72 best shown in Figs. 1b, 4 and 5 of the drawings. As illustrated the shear 72 includes a cutting edge which is adapted to slide along the edge of the soft iron block 57 thereby shearing the tape or recording element 41 between the edge of the shear 72 and the top edge of the soft iron block 57. As best shown in Figs. 3 and 6 of the drawings shear 72 is disposed for vertical movement within a narrow space 73 defined between the magnetic recording means 53 and a cartridge supply chamber or storage magazine 74.

As illustrated each end of the shear 72 is provided with lateral extensions 72a and 72b. In order to cause the shear 72 to follow a predetermined path of movement during a tape shearing operation, shear guides 75 are provided adjacent either end thereof which guides are disposed within the narrow space 73. These shear guides 75 are adapted to be biased by means of suitable springs 76 against the shear 72 and consequently cause the shear to move closely adjacent the iron block 57. Preferably suitable screws 77 permit any desired adjustment of the forces applied by the springs 76 to insure proper shearing action at all times. In order further to control the movement of the shear 72 a suitable operating mechanism is provided engageable with each end of the shear. As illustrated a suitable shaft 78 is journaled for pivotal movement in housing 40. A crank arm 79a is fastened to the end of the shaft 78 adjacent the shear extension 72a and a crank arm 79b is fastened to the other end of the shaft 78. The other ends of the crank arms 79a and 79b are connected by suitable links 80a and 80b respectively to the extensions 72a and 72b respectively of the shear 72. By having one end of each of the cranks 79a and 79b fixedly mounted on the shaft 78 simultaneous movement of both ends of the shear 72 is insured. As illustrated the shear 72 is tapered from one end to the other so that the shearing operation progresses transversely across the tape or recording element 41. Also as illustrated the shear 72 is normally biased to its upper or non-shearing position by suitable means such as a tension spring 81 which has one end thereof connected to the shear extension 72b while the other end is fastened to a suitable member 82 supported from the housing 40.

Any suitable means for operating the shear 72 may be provided. As illustrated this means comprises a solenoid 85 suitably supported by the housing 40 having an armature 86 connected by means of a link 87 with the crank arm 79b. Energization of the winding 85a of the shear solenoid 85 causes its armature 86 to be moved downwardly as shown in Figs. 1b and 6 of the drawings with the result that the crank 79b is moved from the solid line position shown in Fig. 6 to the dotted line position and the recording element 41 is cut off within the narrow space 73.

3. Cartridge storage magazine and ejecting mechanism

In accordance with the present invention a cartridge storage magazine 74 is provided whereby a plurality of empty cartridges 60 may be contained therein preparatory to moving into the recording element receiving position. In this way automatic means may be employed to insert new cartridges at the ends of predetermined calendar periods. If, for example, it is desired to gather the recorded information once per week, then at the end of each week the shear mechanism described above and the cartridge ejecting mechanism to be described are actuated, whereupon the cartridge which contains the recording element having the recorded information for the preceding week thereon may be mailed to the analysis organization. As illustrated the cartridge storage magazine 74 comprises a vertical column for receiving in stacked vertical relationship a plurality of cartridges 60 best shown in Fig. 3 of the drawings. With this arrangement gravity alone can be relied upon to move the cartridges when desired. The cartridges 60 are adapted to be disposed in the magazine 74 with their longitudinal axes horizontal and the openings 61 therein being disposed toward the recording unit 53 so as to be adapted to move into the recording element receiving position. For the purpose of guiding the cartridges 60 within the magazine 74 there are provided a pair of vertical guide rods 90 and 91 suitably fastened within the storage magazine 74. These guide rods 90 and 91 are spaced so that the guide rod 90 engages with the groove 68 of the cartridges 60 and the guide rod 91 engages with the notches 69 of the cartridges 60. The cartridges 60 are inserted through the open top of the cartridge storage magazine 74 and they must be so orientated that the guide rods 90 and 91 engage with the cooperating grooves and notches 68 and 69 respectively, whereupon the openings 61 will be properly disposed so that when the cartridges 60 move to the recording element receiving position, the tape or recording element 41 will automatically enter the opening 61.

For the purpose of holding the cartridges 60 in proper position in the storage magazine there are provided a pair of cartridge holding arms 93 suitably fastened to a shaft 94 journaled in the housing 40. These cartridge arms 93 are, when disposed in the positions shown in Fig. 3 of the drawings, adapted to hold the lowermost cartridge 60, which is in the recording element receiving position, at a predetermined level so that the aperture 61 therein is in position to receive the recording element 41 moving along the table 49 through rotation of the sprocket drive 44. The other cartridges 60 in the magazine 74 are normally supported one on top of the other, in the positions shown, by the lowermost cartridge 60, so as to be free to move downwardly under the influence of gravity at certain desired times.

The cartridge magazine 74 further includes an extension or chute portion 96 which is connected by a curved wall portion 97 with the main portion of the magazine 74. When the cartridge arms 93 are moved so as to permit the lowermost cartridge 60 to fall by gravity the curved wall portion 97 guides the cartridge and causes it to roll into the chute portion 96 where a substantial portion of the cartridge is exposed so that it may readily be grasped and removed for mailing purposes, whereupon the aperture 61 is closed in the manner described above. If desired a suitable alarm switch, not shown, may be provided in the chute 96 so that when a cartridge drops into the chute 96 the switch is closed to actuate an alarm indicating that a cartridge is available for mailing to the analysis organization.

The cartridge arms 93 are adapted to enter appropriate openings 98 cut in the curved wall portion 97 whereby the cartridge arms 93 may be moved completely out of an interfering position relative to the lowermost cartridge in the magazine 74.

For the purpose of ejecting the lowermost cartridge 60 at appropriate times, any suitable means may be provided such for example as a cartridge ejecting solenoid 100, suitably supported by the housing 40. The cartridge ejecting solenoid 100 is illustrated as having an armature 101 connected by means of a suitable crank 102 with the shaft 94. Preferably the wall of the housing 40 is provided with an arcuate opening 104 through which the crank 102 may extend whereby the solenoid 100 may be mounted exteriorally of the housing 40 adjacent the shear solenoid 85 described above if desired. It will be apparent that energization of the winding 100a of the solenoid 100 will cause the crank 102 to rotate the shaft 94 in a counterclockwise direction as viewed in Fig. 6 of the drawings, with the result that the cartridge arms 93 fixedly mounted to the shaft 94 are also rotated in the counterclockwise direction to the lowermost position shown in Fig. 6 of the drawings, whereby the lowermost cartridge 60 is free to move into the chute 96. A suitable lost motion connection is provided between the crank 102 and the solenoid armature 101 to permit pivotal movement of the former and longitudinal movement of the latter in a manner well understood by those skilled in the art. To this end the crank 102 is provided with a yoke 102a, one arm of which is disposed on either side of the armature 101. A pin 107 extends through an opening in the armature 101 and through elongated slots 108 in the arms of the yoke which provide the desired lost motion connection. It will be apparent that energization of the solenoid 100 causes a cartridge-ejecting operation.

Suitable means must be provided to hold the cartridges 60 in the magazine 74 in proper position or in other words, accurately to hold the arms 93 in the position shown in Fig. 3 of the drawings so that the recording element may enter the opening 61 of the lowermost cartridge in the magazine 74. The means for holding the arms 93 in the cartridge holding position must also be releasable when the solenoid 100 is energized.

As illustrated, this is accomplished by means of a tension spring 110 which has its upper end fastened to a bracket 111 supported from the portion of housing 40 defining the cartridge storage magazine 74, while its lower end is connected to a rod 112 suitably connected to the armature 101. The spring force of the tension spring is sufficient to constantly bias the armature 101, the crank 102 and the cartridge holding arms 93 to the positions shown in Fig. 5 of the drawings against a suitable stop 113. This stop 113 is suitably fastened to the housing 40 and extends into the path of movement of the crank 102 as is clearly shown in Figs. 4, 5 and 6 of the drawings so as accurately to position the cartridge holding arms 93. The solenoid 100 is capable of producing sufficient force to move the cartridge arms 93 out of their normal holding positions at high speed, thereby stressing the tension spring 110. If desired the stop 113 may be provided with a cushioning surface where engaged by the crank 102.

During the cartridge ejecting operation when the holding arms 93 are retracted through the openings 98 in the curved wall 97, the support for the cartridges 60 above the cartridge in the recording element receiving position is removed, since these cartridges as was mentioned above are merely stacked one above the other. Hence it is necessary to hold all but the lowermost cartridge in the magazine 74 while the holding arms 93 are moved to the nonholding position to release the lowermost cartridge, since otherwise gravity will cause all of the cartridges 60 in the magazine 73 to move toward the chute 96. To this end there are provided a pair of cartridge supporting fingers 120 connected to a shaft 121 suitably journaled in angle supports 122 fastened to the exterior wall of the magazine 74. The cartridge supporting fingers 120 are adapted to move into the magazine 74 through suitable apertures 123 defined in the housing to the dotted line positions shown in Fig. 5 of the drawings. For the purpose of actuating the fingers 120 to the cartridge-holding position at the proper time, the shaft 121 is suitably connected by means of a crank 125 with the rod 112, so that upon energization of the solenoid 100 the cartridge-holding fingers 120 move from the solid line position shown in Fig. 5 of the drawings to the dotted line position to hold the cartridge 60 which is ready to move to the tape receiving position and the others supported thereby in an elevated position until the cartridge-holding arms 93 are returned by the action of the tension spring 110 to their holding position with the crank 102 against the stop 113 to receive the next cartridge.

4. First driving means for recording element 41

In accordance with the present invention two separate means for causing the recording element 41 to move relative to the recording heads 54 and into the cartridge 60 are provided. The first of these driving means best shown in Figs. 1b, 4, 7 and 12 of the drawings comprises a solenoid actuated ratchet device generally indicated at 130 capable of advancing the recording element 41 in an intermittent manner. Preferably the solenoid actuated ratchet device 130 produces about ¾ of an inch of movement of the recording element 41 in response to each energization of the associated solenoid. As illustrated this device 130 comprises a solenoid 131 including a winding 131a. The solenoid 131 is provided with a movable armature 132 which is normally biased to the position assumed when the winding 131a is unenergized, shown in the drawings, by means of a spring 133. The armature 132 is connected by suitable means to a pivotally mounted lever 134 to which is fastened a suitable pawl 135 biased in any suitable manner into engagement with a ratchet 136. The ratchet 136 is mounted on a suitable shaft 137 suitably journaled in the housing 40 of the recorder 25. Mounted for rotation with the shaft 137 is a gear 138 which meshes with a gear 139 suitably fastened to the shaft 45 of the sprocket drive 44. It is apparent that with this arrangement rotation of the ratchet 136 through engagement by the pawl 135 causes rotation of the sprocket drive 44 and consequently movement of the recording element 41 in a direction toward the cartridge magazine 74. As illustrated best in the schematic showing of Fig. 1b of the drawings and also Fig. 12 energization of the winding 131a causes the pawl 135 to slip over the ratchet teeth of the ratchet 136. Upon deenergization of the winding 131a the spring 133 returns the armature 132 to its initial position and at the same time the pawl 135 engaging the ratchet teeth 136 causes rotation of the shaft 137 and the associated gears 138 and 139 with the consequent movement of the recording element 41.

The particular control for the periodic energizing of the winding 131a of the solenoid 131 will be described in greater detail hereinafter. It will be apparent however that deenergization of winding 131a following energization thereof will permit the force stored in the spring 133 to advance the recording element about three-fourths of an inch or any other suitable amount.

5. Second driving means for recording element 41

It will be apparent that prior to operation of the shear 72 that a sufficient movement of the recording element 41 must be provided to insure that any record produced thereon by the recording heads 54 is moved into the cartridge 60 or at least beyond the shear 72 in order to be included in the record of the appropriate calendar period. Consequently in accordance with the present invention there is provided a second paper drive which is actuated periodically at the end of a predetermined calendar period for a record of the listening habits is desired. If the cartridges 60 are to be mailed to the analysis organization once per week, then the second paper drive means to be described hereinafter is actuated to cause a substantial movement of the recording element 41, at the end of each week. This paper drive might be called the "eighth-day recording element drive" since it is actuated at the beginning of the eighth day when weekly periods are involved. This drive must be capable of pushing the recording element 41 under the recording unit 53, past the shear 72, and into the cartridge 60 in the recording element receiving position so that all the record which has been produced prior to the actuation of the shear 72 will be included in the cartridge 60. This second paper drive is best shown in Figs. 1b, 4 and 6 of the drawings. In the schematic diagram of Fig. 1b the second paper drive generally designated at 140 is indicated as being applied to the opposite end of the sprocket drive 44 from that of the first paper drive 130. It should be understood however that the second paper drive 140 might be applied to either end of the sprocket drive 44 and in Figs. 4 and 6 of the drawings it is illustrated as being applied to the same end of the sprocket drive 44 as the ratchet mechanism 130. The corresponding parts of the second paper drive 140 regardless of the end of the sprocket drive 44 with which associated are designated by the same reference numerals. As illustrated the second paper drive 140 includes a suitable ratchet 141 suitably keyed or otherwise fastened to the shaft 45 for the sprocket drive 44. A disk 142 is floatingly mounted on the shaft 45 of the sprocket drive 44 which disk has mounted thereon a pivotally mounted pawl 143 biased by suitable spring means 144 into engagement with the teeth of the ratchet 141. When the first paper drive mechanism 130 operates to cause rotation of the shaft 45, the disk 142 remains stationary and the pawl 143 slips over the teeth of the ratchet 141.

For the purpose of actuating the second paper drive there is provided a solenoid 145 including a winding 145a and a movable armature 146. The movable armature 146 is connected by means of a link 147 to a suitable crank arm 148 fastened to the floating disk 142. When the solenoid 145 is energized a predetermined rotation of the disk 142 is caused such for example as about one-third of a revolution, in a direction so that the pawl 143 engages the teeth of the ratchet 141 similarly to rotate the shaft 45 and consequently the sprocket drive 44 through about one-third of a revolution. It will be apparent that when the second paper drive 140 operates it will have no adverse effect on the first paper drive 130 since the pawl 135 of the first paper drive then merely slips over the ratchet teeth of the ratchet 136.

CONTROL FOR RECORDER UNIT 25

In order to supply power for energizing the various solenoids 85, 100, 131 and 145 associated with the recorder unit 25 a power cord comprising a pair of conductors 150a and 150b connected to the power source 23, through a suitable plug connector 151 are provided. It will be understood that sequential operation of the solenoids 145, 85 and 100 is desired so that the recording element 41 is first moved to insure that every part having any record thereon is moved into the cartridge 60, after which the shear 72 may operate, following which the cartridge ejecting solenoid 100 may be energized. To secure such proper sequential operation at the end of a predetermined calendar period such as the beginning of the eighth day the conductors 150 are connected to supply the winding 145a of the second paper drive solenoid 145 through the normally open contacts 152 of a relay 153 having a winding 153a. The relay 153 might be referred to as the "eighth-day control relay" in that at the end of a predetermined calendar period such for example as a seven day period it is energized in a manner to be described hereinafter to close its normally open contacts 152. With this arrangement it is apparent that upon energization of the eighth day control relay 153 that the second paper drive solenoid 145 is energized to cause a predetermined movement of the recording element 41 to insure that all of the recording element having any recorded information thereon is moved into the cartridge 60.

In order to energize the shear solenoid 85 immediately after the recording element 41 has been moved by the second paper drive 140, the solenoid 145 has associated therewith an interlocking switch 155 which is adapted to close normally open contacts 156 when the armature 146 reaches the end of its stroke upon energization of the solenoid 145. Closing of the normally open interlock contact 156 connects the power source 23 through the conductors 150a and 150b across the winding 85a of the shear solenoid 85 to cause energization thereof and cutting off the recording element 41 immediately following operation of the second paper drive 140. The relay 153 should be provided with sufficient time delay with respect to drop out to insure that the contacts 152 remain closed a sufficiently long time for the successive energization of the solenoids 145, 85 and 100 in that order.

For the purpose of energizing the cartridge ejecting mechanism immediately after the recording element 41 has been cut off by the shear 72, the shear solenoid is provided with an interlocking switch 158 for closing normally open contacts 159 when the armature 86 of the shear solenoid 85 reaches the ends of its stroke following energization thereof. The contacts 159 connect the power source 23 across the winding 100a of the solenoid 100 through the contacts 156, the contacts 152 and the conductors 150a and 150b. The contacts 152 of the "eighth day control relay" 153 remain closed for the necessary interval of time to permit successive energization of the solenoids 145, 85 and 100.

From the above description it will be understood that whenever the contacts 152 of the relay 153 are closed at the end of a predetermined calendar period successive energization of the solenoids 145, 85 and 100 results, whereupon the recording element 41 is moved a substantial distance into cartridge 60, shear 72 cuts off the recording element 41 and the cartridge ejecting mechanism moves the cartridge 60 out of the tape receiving position into a position where it may readily be grasped and mailed to the analysis organization. At the same time a new cartridge is moved into position to receive the recording element for the successive calendar period.

The relay 153 has been indicated as a low voltage relay and accordingly there is provided a suitable transformer 160 whose primary winding 161 is connected across the conductors 150a and 150b and whose secondary winding 162 is connected in series with the winding 153a of the relay 153 and a suitable time controlled switch means forming a part of the timing unit 27 to be described hereinafter for causing energization of the relay 153 at the end of each predetermined calendar period.

The energization of the winding 131a of the solenoid 131 is dependent upon the operation of the control relays 29, 30 and 31 and the device 32, and consequently no discussion thereof is included in this section of the application but instead is fully described in connection with the section relating to such control relays and device.

CONTROL RELAYS 29, 30, AND 31 AND DEVICE 32

As was mentioned above the recording element 41 does not move continuously with respect to time as in many prior art devices, but is moved only at about the time a record is produced thereon. As illustrated the recording element moves immediately following a recording operation so as to be ready for a successive recording operation. It will be understood that it might equally well be moved immediately preceding a recording operation. It is essential that a record be produced for any change of operation of the receiver 10. Consequently if the tuning is changed, or the receiver is turned on or turned off the recorder 25 must be actuated to record the pertinent information. The control relays 29, 30 and 31 and the device 32 provide the means for actuating the recorder in response to any change in tuning of the receiver 10 as well as when the receiver is turned on or off. The control relay 29 is essentially an "on-off" indicating relay since it is energized when the receiver 10 is turned on and is deenergized when the receiver 10 is turned off. To this end the control relay 29 has its winding 163 connected in series with one conductor of the power cord supplying the receiver 10. The receiver 10 is illustrated as being connected to the source 23 through its power cord and plug connector 24 the winding 163 of the relay 29 and the plug connector 151. The winding 163 of the relay 29 is so designed that when the receiver 10 is turned on a sufficient current flows to the receiver to energize the relay 29 and cause it to close its normally open contacts 29a and 29b and to open its normally closed contacts 29c. The contacts 29a control the supply of power to the relays 30 and 31 and consequently also to the device 32. One side of each of the contacts 29b and 29c are connected together and by means of a conductor 164 are connected to the recording head 54a of the recorder unit 25 whereby as will be described hereinafter the on or off condition of the receiver 10 may be recorded in suitable code.

The control relay 30 essentially comprises a relay responsive to the condition of the contacts 165 of the device 32 for controlling the energization of the relay 31. As illustrated the winding of the relay 30 is energized from the power conductors 23 through suitable conductors 166a and 166b the conductor 166b being connected to the source 23 through the contacts 29a of the relay 29. Whenever the receiver 10 is turned on, power is supplied to the winding of the relay 30 through the contacts 165 of the device 32 to be described in detail hereinafter. The relay 30 is described as an instantaneous-drop-out time-delay-pick-up relay which time-delay pickup is schematically designated by the dashpot 167 shown in Fig. 1a of the drawings. Whenever relay 30 is energized its normally open contacts 30a are closed after a predetermined time delay. Upon deenergization of the relay 30 the contacts 30a are instantaneously opened.

Control relay 31 which may be a bellows operated switch device of some sort, comprises a winding 168 which is energized whenever the relay 30 closes its contacts 30a. Control relay 31 is illustrated as comprising a movable switch arm 169 which is adapted momentarily to engage electrically at an intermediate point in its operating stroke with a stationary contact 170. The relay 31 is provided with a device schematically indicated at 171 for providing a predetermined time delay for either direction of operation, which time delay means could comprise a bellows device or the like. The position of the switch arm 169 when the relay 31 is unenergized is shown in solid lines in Fig. 1a, while the energized position thereof is shown in dotted lines in Fig. 1a of the drawings. It is apparent from Fig. 1a that the contact 170 is in effect a wiping contact which is momentarily engaged by the switch arm in its time delay movement both from the solid line position to the dotted line position of Fig. 1a of the drawings as well as during the movement from the dotted line to the solid line position. The switch arm 169 is connected by means of a conductor 172 and the conductor 166a to one side of the source 23. The wiping switch contact 170 is connected by means of a conductor 173 to the other side of the source 23, through either the conductor 174 or the conductor 175. The path through conductor 174 includes the winding 131a of the first paper drive solenoid 131 as well as the conductor 176a. Whenever switch arm 169 momentarily engages the contact 170 it is apparent that the first paper drive solenoid 131 is energized to advance the recording element 41. The conductor 175 is connected to one input terminal 177a of the code signal generator 26. The other input terminal 177b of the code signal generator 26 is connected by means of a conductor 178 to the opposite side of the power source 23 from that connected to the switch arm 169. Thus it is apparent that the code signal generator 26 as well as the solenoid 131 are energized momentarily as the switch arm 169 engages the contact 170, whereupon suitable code signals are available for recording on element 41. Immediately after deenergization of the solenoid 131 and spring 133 moves the recording element 41 sufficiently relative to the recording heads 54 so that a subsequent record can be produced thereon without interfering with records already produced.

From the above description it will be apparent that whenever the receiver 10 is turned on, actuation of the relay 29 and consequently actuation of the relays 30 and 31 occurs so as to cause a record to be produced on the recording element 41 as well as to cause movement thereof by virtue of the spring 133 immediately after deenergization of the solenoid 131. Also when the receiver 10 is turned off the contact 170 is momentarily engaged by the switch arm 169 to again cause energization of the code signal generator 26 and advance the recording element 41.

It should be understood that whenever any change in the tuning condition of the wave signal receiver 10 occurs that a record should be produced on the recording element 41 whereby it is possible to produce a record without turning the receiver 10 on or off each time. In accordance with the present invention there is provided a suitable device 32 which causes momentary opening of the contacts 165 whenever the tuning of the wave signal receiver 10 is changed. Any suitable means for this purpose may be employed. Several such means are disclosed and claimed in copending Scherbatskoy application, Serial No. 781,988 filed October 24, 1947, and assigned to the same assignee as the present application. As illustrated in Figs. 2a and 2b of the drawings the device 32 might comprise an inertia or friction switch.

Referring now to Figs. 2a and 2b of the drawings there is illustrated a stationary support 180 through which the tuning shaft 16 extends. A plate 181 having a V-shaped notch therein covered with a V-shaped conductor 182 is provided. The plate 181 is provided with an opening through which the shaft 16 extends. The plate or disk, 181, is permitted to have a slight pivotal movement relative to the support 180. The movement is controlled by pins 183 extending from the support 180 into short arcuate slots 184 defined in the plate 181. Fixedly mounted on the tuning shaft 16 is a friction disk 185. The plate 181 is biased into frictional engagement with the friction disk 185 by means of a spring 186 whereby the plate 181 initially tends to move as the tuning shaft 16 is moved. Cooperating with the V-shaped conductor 182 is a V-shaped member 187 which includes on each side of the V, one of the pair of contacts 165 which when in the position shown are bridged by the V-shaped conductor 182. The V-shaped member 187 is supported on an arm 188 pivotally mounted from the support 180, and a spring 189 biases the member 187 into the V-shaped notch in the plate 181 into engagement with the V-shaped conductor 182. The V-shaped conductor 182 effectively comprises the switch blade for normally bridging the contacts 165 and in Fig. 1a of the drawings the switching member for the contacts 165 is designated by the same reference numeral 182. Whenever the tuning shaft 16 is moved, the friction disk 185 tends to rotate the plate 181 whereby the V-shaped member 187 is momentarily moved out of the notch defined by the V-shaped conductor 182 to an extent sufficient to break the bridging connection across the contacts 165. However the spring 189 biases the member 187 into the notch to immediately reclose the circuit at the contacts 165 as soon as rotation of the tuning shaft 16 stops. It should be understood that instead of mounting such a device 32 directly on the tuning shaft 16 a suitable mechanical connection to such shaft may be made by means of Bowden wire or the like and any suitable means for momentarily interrupting the circuit of the relay 30 whenever a change in the tuning occurs is all that is desired. It will be understood that if the recording mechanism and associated apparatus are remote from the receiver 10 such as is disclosed in the above mentioned copending Rahmel and Bentley application then suitable means remote from the receiver responsive to the change in tuning may be provided for momentarily interrupting the energization of the relay 30.

CODE SIGNAL GENERATOR 26

Any suitable means may be employed for generating the code signals which are recorded on the recording element 41 and which are indicative of certain information. Such a generator may comprise a source of discrete characteristics the number of discrete characteristics being dependent upon the number of variables desired. It should be understood that the variable characteristic might comprise current, voltage, frequency or the like. As illustrated the code signal generator 26 is capable of producing a plurality of signals each of a different unique frequency. It will be understood that such a generator could comprise a plurality of oscillators each capable of producing a signal of a different predetermined frequency. As illustrated the code signal generator 26 comprises a plurality of tuned reeds each tuned to a predetermined frequency, ten such tuned reeds which are specifically designated as 190a, 190b, 190c, 190d, 190e, 190f, 190g, 190h, 190i, and 190j being indicated in Fig. 1c of the drawings. Any suitable frequency range may be employed if tuned reeds are employed although preferably low frequency signals within the range of 10 to 100 cycles per second are preferable. It should be understood that if oscillators are employed instead of tuned reeds that signals having frequencies up to seven thousand or more cycles per second may be employed. As a specific example the tuned reeds 190 may comprise the following frequencies:

| Reed | Natural frequency, cycles per second |
| --- | --- |
| 190a | 16 |
| 190b | 21⅜ |
| 190c | 25 |
| 190d | 35 |
| 190e | 47 |
| 190f | 55 |
| 190g | 61 |
| 190h | 65½ |
| 190i | 80 |
| 190j | 83⅜ |

Each of the tuned reeds 190 is adapted to vibrate between spaced contacts 191 and 192. In order to provide a suitable source of direct current potential for the vibrating reeds 190 there is interposed between the terminals 177a and 177b and the vibrating reeds 190 a full wave rectifier generally designated at 193 and a suitable filter indicated at 194. The positive terminal of the full wave rectifier 193 is indicated as being connected directly to the ten vibrating reeds 190 in parallel. The negative terminal of the full wave rectifier 193 is connected to all the contacts 192 in parallel through a plurality of windings 195, one winding being individual to each vibrating reed. The negative terminal of the full wave rectifier 193 is connected to all the contacts 191 in parallel through a plurality of windings 196, one winding being individual to each vibrating reed. As illustrated all the vibrating reeds 190 are normally in engagement with their associated contacts 191 so that if power is applied to the input of the rectifier 193 current will flow through the windings 196 producing electromagnetic forces for moving the vibrating reeds away from the contacts 191 and into engagement with the contacts 192. As long as power is applied the vibrating reeds 190 will vibrate at the particular frequency for which they are designed and alternating half cycles of current will flow through the windings 195. It will be apparent that a winding inductively coupled with any of the windings 195 will have an alternating current induced therein of the frequency of the associated vibrating reed. Accordingly each of the windings 195 is coupled inductively with an associated winding 197. The windings 197 have a common terminal connected to a conductor 198 which is common to all of the recording heads 54 as is clearly indicated in Fig. 1b of the drawings. The other terminals of the windings 197 are brought out individually and are designated by the letters A, B, C, D, E, F, G, H, I, and J respectively. It will be apparent that at the terminals A to J inclusive of the code signal generator 26 there is available a code signal which has a different characteristic at each terminal. Although signals having ten different frequencies can be produced with the code signal generator 26 illustrated, it will be understood that more than this number or fewer than this number may be employed. Actually with ten recording heads each of which may be supplied with signals of ten different frequencies it is apparent that means for producing a very flexible code is provided.

TIMING UNIT 27

It will be understood that one of the variables which must be recorded on the recording element 41 in addition to the particular tuning condition of the receiver 10, is time. Not only is it necessary to know to which channels the receiver 10 was tuned, but for how long and for what particular periods of time must also be recorded. With the recorder 25 of the present invention this time information is applied when any change in the operation of the wave signal receiver 10 occurs, such as a change in tuning or a turning on or turning off of the receiver. The pertinent time information may be supplied in various ways. It is, of course desirable to know the particular day of the week, the hour of the day, and the particular minute in the hour at which any change in the operation of the receiver 10 occurs. If such time information is applied each time any change in tuning of the receiver occurs then it is readily possible to determine the extent of use of the receiver 10. Any suitable means for obtaining this time information may be employed. As illustrated, the information is applied to the recording element 41 by means of the recording heads 54d, 54e, 54f, 54g, and 54h, the recording element 54d recording the particular minute up to ten minutes, the recording element 54e recording the particular 10-minute period in any given hour, the recording head 54f recording the particular hour up to six in any quarter day period, the recording head 54g recording the particular quarter day of any given day and the recording head 54h recording the particular day from one to seven in any given week.

For the purpose of obtaining such time information, there is provided a synchronous motor 200 which is connected by means of conductors 176a and 176b with the power source 23 preferably through the plug connector 151. The synchronous motor 200 is adapted to drive a plurality of synchronous switches for supplying the desired time information in minutes, ten minutes, hours, quarter days and days. To provide the desired minute information the synchronous motor 200 is connected by means of a shaft 203 to a synchronous switch arm 204 which is adapted to engage spaced contacts 205a, 205b, 205c, 205d, 205e, 205f, 205g, 205h, 205i and 205j, arranged in equally spaced relationship about the circumference of a circle. The synchronous switch arm 204 is rotated at six revolutions per hour so that the space between each of the contacts 205 is equivalent to one minute, ten contacts being provided whereby one revolution of the synchronous switch arm 204 is equal to ten minutes. As illustrated the synchronous switch arm 204 is designed so as to engage the succeeding contact immediately upon its disengaging the preceding contact. The switch arm 204 is connected by means of a conductor 206 with the recording head 54d. The contacts 205a, 205b, 205c, 205d, 205e, 205f, 205g, 205h, 205i and 205j on the other hand are connected by means of suitable conductors 207a to 207j respectively which are contained within a suitable cable 208 connected to the terminals A to J respectively of the code signal generator 26, each contact 205 marked with an appropriate subscript being connected to the terminal marked with the same letter. It will be apparent then that whenever the code signal generator is energized a signal of a predetermined frequency depending upon the particular contact 205 with which the synchronous switch arm 204 is in engagement at that instant will be recorded on the recording element by the recording head 54d. Thus in any given ten-minute period a code indication of the particular minute in the ten-minute period will be recorded.

In order to produce a means for obtaining the particular ten-minute period of which there are six in any given hour, the synchronous motor 200 is connected by means of a shaft 210 and a reduction gear 211 to a shaft 212 upon which is mounted a synchronous switch arm 213. The synchronous switch arm 213 is adapted to rotate at twelve revolutions per day, or in other words, one revolution every two hours, which means that one revolution comprises twelve ten-minute periods. To this end there are provided twelve contacts 214 specifically designated as 214a, 214b, 214c, 214d, 214e, 214f, 214'a, 214'b, 214'c, 214'd, 214'e and 214'f arranged in equally spaced relationship about the circumference of a circle so as to be engageable in that order by the rotary switch arm 213. The contacts with the same subscript are connected together and in turn are respectively connected by means of suitable conductors 215a to 215f, inclusive which are preferably included in a suitable cable 216, with the terminals A to F inclusive of the code signal generator 26. In this way the six ten-minute periods in each hour will be designated by a code signal having a unique frequency; the first ten-minute period being designated by one code signal, the second by another, etc. The synchronous switch arm 213 is connected by means of a conductor 218 with a recording head 54e for recording the particular ten-minute period, whereupon a particular frequency is recorded on the recording element 41 in dependence upon the particular contact 214 with which the synchronous switch arm 213 is in engagement.

Since quarter day time information is recorded it is only necessary to record the particular hour in each quarter day, or in other words hourly time information for six-hour periods. For the purpose of producing such hour time indications the timing unit 27 includes three independent synchronous switch arms 220, 221 and 222. The synchronous switch arm 222 is rotatable with the shaft 212 at twelve revolutions per day or one revolution every two hours. The synchronous switch arms 220 and 221 are rotatable with a shaft 224 which rotates one revolution per day and is connected through a reduction gear mechanism 225 and the shaft 226 with the shaft 212. The synchronous switches 220 and 221 are adapted to engage suitable contacts designated as 228, twelve contacts being associated with each synchronous switch and arranged in equally spaced relationship about the circumference of a circle. The contacts 228 associated with the synchronous switch arm 220 are designated as 228a, 228c and 228e in that order and repeat themselves four times during one revolution of the synchronous switch arm 220. The contacts 228a, 228c and 228e are connected by means of conductors 230a, 230c and 230e respectively arranged in a cable 231a to the corresponding terminals A, C and E of the code signal generator 26 respectively. Similarly, the contacts 228b, 228d and 228f associated with the synchronous switch arm 221 are connected by the conductors 230b, 230d and 230f respectively with the terminals B, D and F respectively of the code signal generator 26 through a cable 231b.

For the purpose of rendering the synchronous switch arms 220 and 221 alternately effective the synchronous switch arm 222 is provided which rotates at one revolution every two hours. This synchronous switch arm 222 is adapted to engage with either one of two semi-circular contacts 232a and 232b respectively. The contact 232a is electrically connected by means of a conductor 233 with the synchronous switch arm 220 while the contact 232b is connected by means of a conductor 234 with the synchronous switch arm 221. The synchronous switch arm 222 is connected by means of a conductor 235 with the recording head 54f. Consequently a different code indication for each hour of each quarter day period is provided on the recording element 41 by the recording head 54f.

For the purpose of recording the particular quarter day time information there is provided a synchronous switch arm 240 mounted for rotation with the shaft 224 which rotates at one revolution per day. The synchronous switch arm 240 is adapted during its rotation successively to engage with four equally spaced contacts 241a, 241b, 241c and 241d respectively. These contacts are connected by means of suitable conductors disposed in a cable 242 with the appropriate terminals A, B, C and D respectively of the code signal generator 26. The synchronous switch arm 240 is arranged to remain in engagement with one of its contacts 241 until just an instant before it engages with the succeeding contact. Furthermore, the synchronous switch arm 240 is connected by means of a conductor 245 with the quarter day recording head 54g so as to record in a code signal having unique frequency characteristics the four quarters of any particular day.

For the purpose of obtaining a record of the day per week the synchronous motor 200 is adapted to drive through reduction gearing 211, 225 and 247, and suitable connecting shafts, a shaft 248 at one revolution per week. This shaft 248 has fixedly attached thereto a suitable rotary switch arm 249 adapted to successively engage a plurality of contacts 250a, 250b, 250c, 250d, 250e, 250f and 250g arranged in equally spaced relationship about the circumference of a circle, each contact being indicative of a particular day of a seven-day week. As with the other timing units the contacts 250a to 250g are connected by suitable conductors embodied in a cable 251 with the appropriate terminals A, B, C, D, E, F and G respectively of the code signal generator 26. The synchronous switch arm 249 is connected by means of a conductor 252 with the recording head 54h for recording days on the recording element 41. It will be apparent that if the code signal generator 26 were able to produce twenty-four discrete frequencies the timing unit could be considerably simplified since a single switch having 24 contacts and rotating at one revolution per day would supply the hour information and suitable means for supplying quarter hour information and minute information could readily be provided. It will be apparent furthermore that the timing unit operates continuously so that at any instant when power is supplied to the code signal generator 26 a code will be supplied to each of the recording heads 54d, 54e, 54f, 54g and 54h thereby recording complete time information for any instant in a calendar period of one week. It will be understood that where a different calendar period is chosen, either more or less time information may be supplied depending on the particular period.

As was mentioned above it is desirable at the end of each seven day period, or at the beginning of the eighth day, to actuate the second paper drive mechanism 146, the shear 72 and the cartridge release mechanism. To this end it is desirable to energize the relay 153 at the first minute of the eighth day, for example. To accomplish this a synchronous switch arm 260 is rotatably mounted with the shaft 248 so as to engage a suitable contact 261 on the eighth day. Similarly a rotatable switch arm 262 is rotatable with the shaft 224 at one revolution per day to engage during the first hour of each day the contact 263. Also a rotatable switch arm 264 rotatable at one revolution every two hours is connected to the shaft 212 so as to engage for a ten-minute period during the first ten minutes of each day with a contact 265. In addition a synchronous switch arm 267 rotatable at one revolution every ten minutes is adapted to engage with the stationary contact 268 during the first minute of each ten minute period. The rotary switch arms 260, 262, 264 and 267 and the associated contacts 261, 263, 265 and 268 are all connected in series with a pair of conductors 270 and 271 which in turn are connected in series with the winding 153a of the relay 153, and the secondary winding 162 of the transformer 160. When each of these rotary switch arms 260, 262, 264 and 267 simultaneously engage their associated contacts 261, 263, 265 and 268 respectively, which can occur only during the first minute of the eighth day, for the arrangement described, then the relay 153 is energized to close its contacts 152 and actuate the second paper drive 146, the shear 72 and the cartridge release mechanism described above.

It is a well known fact that the same tuning channel on the receiver may bring in one station during day time reception and another for night time reception. Hence it is desirable to know at once whether day or night listening is involved. Accordingly there is provided a synchronous switch arm 273 rotatable at one revolution per day with the shaft 224. This synchronous switch arm 273 is adapted to engage for one half revolution with a contact 274. As illustrated the synchronous switch arm 273 is adapted to control the energization of a relay 276, the winding of which is connected by means of conductors 277 and 278 across the secondary winding 162 of the transformer 160. With this arrangement the relay 276 is energized to close its normally open contacts 276a during the night time for example and is deenergized to close its normally closed contacts 276b during the day time. This information may be coded by the recording head 54i which is connected by means of a conductor 280 with each set of contacts 276a and 276b. One contact of the set of contacts 276a is connected to a particular terminal of the code signal generator 26 while one contact of the set of contacts 276b is connected to a different terminal of the code signal generator 26. As illustrated one of the contacts 276a is connected to the A terminal by means of the conductor 281 and one of the contacts 276b is connected to the B terminal of the code signal generator 26 by means of the conductor 282. In this way a signal having the frequency of the vibrating reed 190a will be impressed on the recording head 54i whenever the code signal generator 26 is energized and the relay 276 is simultaneously energized. When the relay 276 is deenergized then a signal having the frequency of the vibrating reed 190b will be impressed on the recording head 54i whenever the code signal generator 26 is energized.

STATION TRANSLATOR 28

In order to provide an indication of the particular channel to which the wave signal receiver 10 is tuned there is provided a station translator 28 capable of translating into code the particular tuning condition of the receiver 10. This station translator may comprise any suitable device for accomplishing the purpose. As illustrated it comprises a rotary switch arm 300 connected by means of an extension 301 to the tuning shaft 16 of the receiver 10, the station translator 28 being capable of rotating through 360°. If the tuning shaft 16 is not capable of rotating through such a large angle a suitable step up gear mechanism 303 may be interposed between the tuning shaft 16 and the station selector shaft 301. It should furthermore be understood that the position of the arm 300 which is indicated as a pivotal arm but which might be a movable arm in any other manner could be controlled mechanically by means of a Bowden wire or electrically by a suitable electrical or space link between the receiver 10 and the station translator 28, such for example as is disclosed in the above-mentioned Rahmel and Bentley application.

In order that a very large number of stations may be coded by means of the station translator 28, the switch arm 300 is provided with two contacting portions 300a and 300b respectively which are connected by individual conductors 305 and 306 respectively with the recording heads 54b and 54c respectively. The channels may be designated by numbers from one to ninety-nine and one contacting portion such as 300a may control the designation of "digits," one to nine of the channel number while the contacting portion 300b may control the designation of "tens" from one to nine of the channel number. The contacting portion 300a is adapted to engage one of a plurality of contacts 307 arranged around the periphery of a circle in any suitable manner. These contacts may be arranged to be spaced in any adjustable manner and to have a variable contact width as is disclosed in the copending Rahmel and Bentley application mentioned above. As illustrated the contacts are arranged in groups of ten, 307a, 307b, 307c, 307d, 307e, 307f, 307g, 307h, and 307i and connected to the appropriate terminals A, B, C, D, E, F, G, H and I respectively of the code signal generator 26 through suitable conductors contained in a cable 308. The contact portion 300b of the switch arm 300 is adapted to engage contacts 309 arranged in groups of ten around the circumference of a circle, ten successive contacts being designated as 309a and connected to the A terminal of the code signal generator 26; the next ten successive contacts being designated as 309b and all connected in parallel to the B terminal of the code signal generator 26 through the cable 308. The contacting portion 300b is indicated as being adapted to contact with six groups of contacts, all but one group of which have ten contacts included in the group, which means that over fifty stations or channels can be coded by means of the station translator 28 and obviously if a larger number is desired the provision of additional contacts requiring not more than ten discrete frequencies can readily be provided.

It will be understood that the station translator 28 is capable of translating the tuning position of the receiver 10 regardless of the particular band in which the receiver is tuned to a particular code which is recorded by means of the recording heads 54b and 54c on the recording element 41.

MISCELLANEOUS

From the above discussion the "receiver on" code and the "receiver off" code can readily be applied to the recording head 54a through the control relay 29. Each of the sets of contacts 29b and 29c are illustrated as being connected by the conductor 164 with the recording head 54a. The "On" contacts 29b are indicated as being connected to the A terminal of the code signal generator 26 through the conductor 311 while the "Off" contacts 29c are connected to the B terminal of the code signal generator 26 through a conductor 312.

It will be apparent that any additional desired information may be supplied to the recording head 54j. Such information might be concerned with whether a phonograph unit associated with the signal receiver 10 is turned on, in the event the wave signal receiver 10 comprises a receiver phonograph combination. Also where a plurality of receivers are being monitored the particular receiver or receivers in use can be indicated in a simple manner by the code device described.

In view of the detailed description included above the operation of the apparatus of the present invention will be understood and only a brief discussion is included herewith with reference to a typical record indicated in Fig. 13 of the drawings. Since the recording heads 54a to 54j inclusive are equally spaced transversely of the recording element 41, record indications in the form of variable frequency signals are produced on the recording element 41 along equally spaced channels designated as 320a to 320j inclusive. The recording head 54j is not illustrated as being connected to any control means so that no record indications are produced along the channel 320j of the recording element 41 shown in Fig. 13 of the drawings. Whenever the receiver manual control knob 13 is actuated to turn the receiver either on or off the relay 29 is either energized or deenergized to produce a trace along the channel 320a having a frequency of the vibrating reed 190a if the wave signal receiver 10 is turned on and a frequency of the vibrating reed 190b if the wave signal receiver 10 is turned off. Every time record indications are produced on the recording element 41 the on or off condition of the receiver 10 will be designated along the channel 320a. Along the channel 320b will appear variable frequencies from the vibrating reeds 190a to 190j depending upon the position of the station translator 28, thus indicating in units from one to ten the units portion of a particular transmitting station number. Along channel 54c will be recorded the tens of the station number. By means of the device 32 any change in the tuning condition of the wave signal receiver 10 will cause an actuation of the switch 169 and consequently a recording on the recording element 41 of various conditions of the receiver as well as the specific time information. Along the channel 320d minutes from one to ten in any given ten-minute period will be indicated by ten discrete signals each of a different frequency. Along the channel 320e the particular one of the six ten-minute periods in any hour will be indicated. Along the channel 320f the hours in a quarter day period from one to six will be indicated while in channel 329g the quarter days of any given day from one to four will be indicated by four discrete frequency signals. Along the channel 320h the days of any given week from one to seven will be indicated by seven discrete signals each of different frequency. In channel 320i the a. m. or p. m. listening conditions will be designated by two discrete signals of different frequency. A typical record is designated in Fig. 13 where the variable frequencies are indicated. It is noted that where a recording was produced by virtue of a change in tuning of the receiver that successive signals in channel 320a are of the same frequency, indicating that the receiver was in the "on" condition for successive recordings. At the end of a listening period when the receiver is turned off a higher frequency signal is produced in channel 320a indicating that the receiver is turned off.

It will be understood that each time a recording is produced on the recording element 41 that the tape is advanced a short distance by the first driving means 130. It will be observed that with this arrangement successive record indications are very closely spaced on the recording element 41 and long stretches of blank tape do not occur as in prior art devices where the recording element moves continuously with time. At the end of the seventh day, for example, the second driving means 140 for the recording element 41 is rendered effective to cause a substantially greater movement of the recording element 41 so that all portions of the element having record indications thereon are moved into the mailable cartridge 60. Following the operation of the second driving means 140 the shear 72 is actuated and cut off the recording element upon which record indications have been produced from the "unexposed" recording element. The recording element which has record indications thereon is all disposed within the mailable cartridge or magazine 60 which is ejected by the cartridge ejecting mechanism and may then be mailed to the analysis organization.

It will be apparent that with the arrangement described above the pertinent information regarding the tuning condition of the wave signal receiver 10 is placed upon a recording element in the form of a code which lends itself to ready decoding by automatic machines or computing devices. It is furthermore apparent that the recording heads 54a to 54j inclusive are capable of recording a great deal of additional information which might be desired, such as where a plurality of receivers are involved, where a phonograph combination is involved and the like. If the receiver 10 is not used for long periods of time no recording element is wasted as in prior art arrangements.

It will be apparent to those skilled in the art that the present invention is not limited to the particular embodiment shown and described, but that changes and modifications may be made without departing from the spirit and scope of the present invention. It is aimed in the appended claims to cover all such changes and modifications.

What is desired to be secured by Letters Patent of the United States is:

1. In a device for recording the tuning condition of a wave signal receiver, means for movably supporting a record element upon which record indications may be produced, a mailable cartridge having an opening defined therein disposed so as to receive said record element after record indications are produced thereon, means responsive to any change in the operating condition of said receiver for producing a plurality of record indications on said record element indicative of the tuning condition of said receiver and the specific time at the instant the record indications are produced, a first means for moving said record element approximately at the time of operation of said last mentioned means, a second means independent of said first means for moving said record element at the end of a predetermined calendar period, and means operative in response to the operation of said second means for cutting off said record element at the opening in said mailable cartridge.

2. In a device for recording the tuning condition of a wave signal receiver, means for movably supporting a record element thereon, a first means for moving said record element so that successive record indications may be produced thereon, a mailable cartridge including an opening therein disposed to receive the end of said record element when moved by said first means, means for producing record indications on said element indicative of the tuning condition of said receiver at various times, a second means for moving said record element a substantial amount so that all portions thereof having record indications thereon are moved into said cartridge, and means operative in response to the operation of said second means for severing the portion of said record element disposed within said cartridge from the remainder of said record element.

3. In a device for recording the tuning condition of a wave signal receiver, means for movably supporting a record element upon which record indications may be produced, a mailable cartridge having an opening defined therein disposed so as to receive said record element after record indications are produced thereon, means responsive to any change in the operating condition of said receiver for producing a plurality of record indications on said record element indicative of the tuning condition of said receiver and the specific time at the instant the record indications are produced, a first means for moving said record element approximately at the time of operation of said last mentioned means, a second means independent of said first means for moving said record element at the end of a predetermined calendar period, means operative in response to the operation of said second means for cutting off said record element at the opening in said mailable cartridge, and means for automatically ejecting said cartridge in response to operation of said last mentioned means.

4. In a device for recording the tuning condition of a wave signal receiver, means for movably supporting a record element upon which record indications may be produced, a mailable cartridge having an opening defined therein disposed so as to receive said record element after record indications are produced thereon, means responsive to any change in the operating condition of said receiver for producing a plurality of record indications on said record element indicative of the tuning condition of said receiver and the specific time at the instant the record indications are produced, a first solenoid operated means for moving said record element approximately at the time of operation of said last mentioned means, a second solenoid operated means independent of said first means for moving said record element at the end of a predetermined calendar period, means operative in response to the operation of said second means for cutting off said record element at the opening in said mailable cartridge, and means responsive to the operation of said last mentioned means for automatically ejecting said cartridge and replacing the same with a different cartridge.

5. In a device for recording the tuning condition of a wave signal receiver, means for movably supporting a record element upon which record indications may be produced, means responsive to any change in the operating condition of said receiver for producing a plurality of record indications on said record element indicative of the tuning condition of said receiver and the specific time at the instant the record indications are produced, a first means for moving said record element approximately at the time of operation of said last mentioned means, a second means independent of said first means for moving said record element at the end of a predetermined calendar period and means operative in response to the operation of said second means for separating the portion of said record element upon which record indications are produced from the remainder of said record element.

6. In a device for recording the tuning condition of a wave signal receiver, means for movably supporting a record element thereon, a first means for moving said record element by relatively small increments so that successive record indications may be produced thereon, means for producing record indications on said element indicative of the tuning condition of said receiver at various times, a second means for moving said record element a substantially greater amount than the movement produced by said first means, and means operative in response to the operation of said second means for severing the portion of said record element having record indications thereon from the remainder of said record element.

7. In a device for recording the tuning condition of a wave signal receiver, means for movably supporting a record element thereon, a first means for moving said record element so that successive record indications may be produced thereon, a mailable cartridge including an opening therein disposed to receive the end of said record element when moved by said first means, means for producing record indications on said element indicative of the tuning condition of said receiver at various times, a second means for moving said record element a substantial amount so that all portions thereof having record indications thereon are moved into said cartridge, means operative in response to the operation of said second means for severing the portion of said record element disposed within said cartridge from the remainder of said record element, and means for ejecting said cartridge following operation of said last mentioned means.

8. In a device for recording the tuning condition of a wave signal receiver, means for movably supporting a record element thereon, a first means for moving said record element so that successive record indications may be produced thereon, a storage magazine, a plurality of mailable cartridges in said magazine each including an opening therein, means for positioning one of said mailable cartridges so that the opening therein is adapted to receive the end of said record element when moved by said first means, means for producing record indications on said element indicative of the tuning condition of said receiver at various times, a second means for moving said record element a substantial amount so that all portions thereof having record indications thereon are moved into said one cartridge, and means operative in response to the operation of said second means for severing the portion of said record element disposed within said one cartridge from the remainder of said record element.

9. In a device for recording the tuning condition of a wave signal receiver, means for movably supporting a record element thereon, a first means for moving said record element so that successive record indications may be produced thereon, a storage magazine, a plurality of mailable cartridges in said magazine each including an opening therein, means for positioning one of said mailable cartridges so that the opening therein is adapted to receive the end of said record element when moved by said first means, means for producing record indications on said element indicative of the tuning condition of said receiver at various times, a second means for moving said record element a substantial amount so that all portions thereof having record indications thereon are moved into said one cartridge, means operative in response to the operation of said second means for severing the portion of said record element disposed within said one cartridge from the remainder of said record element, and means responsive to the operation of said last named means for ejecting said one cartridge and replacing it with another of the cartridges disposed in said magazine.

10. In a device for recording the tuning condition of a wave signal receiver, means for movably supporting a record element upon which record indications may be produced, a code signal generator capable of generating a plurality of unique code signals, means responsive to any change in the operating condition of said receiver for momentarily rendering said code signal generator effective, and means responsive to the energization of said code signal generator for recording in unique code signals on said record element the particular tuning condition of said receiver, the time of day, and the day of a predetermined calendar period at the instant of said recording.

11. In a device for recording the tuning condition of a wave signal receiver, means for movably supporting a record element upon which record indications may be produced, a code signal generator capable of generating a plurality of unique code signals, means responsive to any change in the operating condition of said receiver for momentarily rendering said code signal generator effective, and means including a plurality of independent recording means responsive to the energization of said code signal generator for recording in unique code signals in separate equally spaced channels on said record element information pertinent to the tuning condition of said receiver.

12. In a device for recording information pertinent to the tuning condition of a wave signal receiver, means for movably supporting a record element upon which record indications may be produced, a code signal generator capable of generating a plurality of unique code signals, means responsive to any change in the operating condition of said receiver for momentarily rendering said code signal generator effective, and means responsive to the momentary energization of said code signal generator for recording in a plurality of spaced channels on said record element in unique code signals the particular tuning channel to which said receiver is tuned, the condition of the control switch of said receiver, and the specific time at the instant of recording including the minute, hour and day as well as whether the recording is made in the forenoon or afternoon.

13. In a device for recording information pertinent to the tuning condition of a wave signal receiver, means for movably supporting a record element thereon, a storage magazine, a plurality of mailable cartridges stacked in said magazine each including an opening therein, means for guiding said cartridges in said magazine, means for positioning one of said mailable cartridges so that the opening therein is adapted to receive the end of said record element, means for moving said record element into said one magazine, and means for automatically ejecting said one cartridge and replacing the same with another of said cartridges in said magazine.

14. In a recording device, means for movably supporting a record element upon which record indications may be produced, a mailable magazine having an opening defined therein disposed so as to receive said record element after record indications are produced thereon, means for producing a plurality of record indications on said record element, a first means for moving said record element, a second means independent of said first means for moving said record element at a predetermined time, means operative in responsive to the operation of said second means for cutting off said record element at the opening in said mailable magazine, and means for automatically ejecting said magazine in response to operation of said last mentioned means.

15. In a recording device, means for movably supporting a record element thereon, a first means for moving said record element by relatively small increments so that successive record indications may be produced thereon, means for producing record indications on said element, a second means for moving said record element a substantially greater amount than the movement produce by said first means, and means operative in response to the operation of said second means for severing the portion of said record element having record indications thereon from the remainder of said record element.

16. In a recording device, means for movably supporting a record element thereon, a first means for moving said record element so that successive record indications may be produced thereon, a mailable magazine including an opening therein disposed to receive the end of said record element when moved by said first means, means for producing record indications on said element, a second means for moving said record element a substantial amount so that all portions thereof having record indications thereon are moved into said magazine, means operative in response to the operation of said second means for severing the portion of said record element disposed within said magazine from the remainder of said record element, and means for ejecting said magazine following operation of said last mentioned means.

17. In a device for identifying the program choice of a person utilizing a wave signal receiver, comprising a recorder including means for movably supporting a magnetic record receiving element and magnetic recording means for producing a record on said element together with means for moving said element a short increment of distance only at approximately the time when a record is produced thereon, means responsive to the tuning condition of said wave signal receiver for producing a unique electrical signal representative of the particular program choice of said person, and means for supplying said magnetic recording means with a signal representative of said unique signal whereby a record of said program choice is produced on said record receiving element.

GEORGE RALPH CORDELL.

References Cited in the file of this patent

UNITED STATES PATENTS

| Number | Name | Date |
| --- | --- | --- |
| 1,159,732 | Akeley | Nov. 9, 1915 |
| 1,222,332 | Akeley | Apr. 17, 1917 |
| 1,469,485 | Rivetta | Oct. 2, 1923 |
| 1,776,263 | Marcalus | Sept. 23, 1930 |
| 2,095,849 | Wittal | Oct. 12, 1937 |
| 2,188,377 | Small | Jan. 30, 1940 |
| 2,213,886 | Potter | Sept. 3, 1940 |
| 2,342,167 | Potter | Feb. 22, 1944 |
| 2,397,562 | Potter | Apr. 2, 1946 |
| 2,466,804 | Giffen et al. | Apr. 12, 1949 |
| 2,484,734 | Rahmel | Oct. 11, 1949 |